(12) United States Patent
Yang et al.

(10) Patent No.: US 12,290,775 B2
(45) Date of Patent: May 6, 2025

(54) AIR CLEANER

(71) Applicant: LG Electronics Inc., Seoul (KR)

(72) Inventors: Taeman Yang, Seoul (KR); Junho Min, Seoul (KR); Joonmin Park, Seoul (KR); Choonmyun Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 883 days.

(21) Appl. No.: 17/371,697

(22) Filed: Jul. 9, 2021

(65) Prior Publication Data

US 2022/0008855 A1 Jan. 13, 2022

(30) Foreign Application Priority Data

Jul. 10, 2020 (KR) .................. 10-2020-0085469

(51) Int. Cl.
*B01D 46/00* (2022.01)
*B01D 46/24* (2006.01)
*B01D 46/60* (2022.01)

(52) U.S. Cl.
CPC ..... *B01D 46/0049* (2013.01); *B01D 46/2403* (2013.01); *B01D 46/60* (2022.01); *B01D 2273/30* (2013.01)

(58) Field of Classification Search
None
See application file for complete search history.

(56) References Cited

U.S. PATENT DOCUMENTS

| | | | |
|---|---|---|---|
| 9,914,082 B2 * | 3/2018 | Park | B01D 46/4227 |
| 2017/0246576 A1 * | 8/2017 | Jung | B01D 46/24 |
| 2017/0246578 A1 * | 8/2017 | Jung | B01D 46/24 |
| 2017/0246581 A1 * | 8/2017 | Jung | F24F 8/10 |
| 2017/0321720 A1 * | 11/2017 | Park | F01P 7/167 |

(Continued)

FOREIGN PATENT DOCUMENTS

| CN | 2000-255256 | 9/2000 |
|---|---|---|
| CN | 1515845 | 7/2004 |

(Continued)

OTHER PUBLICATIONS

Espacenet translation of CN 208579428U, https://worldwide.espacenet.com/patent/search/family/065511501/publication/CN208579428U?q=cn208579428 (Year: 2018).*

(Continued)

*Primary Examiner* — Brit E. Anbacht
(74) *Attorney, Agent, or Firm* — Fish & Richardson P.C.

(57) ABSTRACT

An air cleaner includes a first blowing device having a first inlet and a first outlet, a second blowing device disposed above the first blowing device and having a second inlet, and a partition plate disposed between the first outlet and the second blowing device. The first blowing device includes a case forming the first inlet and opened in an upper side, a discharge guide device disposed in the opened upper side of the case and forming the first outlet, a first fan disposed inside the case and forming an air flow from the first inlet to the first outlet, and a splitter disposed between the partition plate and a discharge guide device and extending upward from the discharge guide device in a radial direction of the discharge guide device to separate an air flow discharged from the first outlet and guide the air flow in the radially outward direction.

20 Claims, 16 Drawing Sheets

(56) References Cited

U.S. PATENT DOCUMENTS

| | | | | |
|---|---|---|---|---|
| 2018/0023579 | A1* | 1/2018 | Park | F04D 29/703 |
| | | | | 310/40.5 |
| 2019/0264948 | A1* | 8/2019 | Jung | A61L 2/22 |
| 2021/0278097 | A1* | 9/2021 | Min | F24F 13/20 |
| 2022/0008855 | A1* | 1/2022 | Yang | F24F 8/10 |
| 2022/0008856 | A1* | 1/2022 | Yang | F24F 13/10 |
| 2022/0010799 | A1* | 1/2022 | Park | F24F 13/10 |
| 2022/0010991 | A1* | 1/2022 | Yang | F24F 8/80 |
| 2022/0011009 | A1* | 1/2022 | Lee | F24F 13/20 |
| 2022/0011011 | A1* | 1/2022 | Yang | F24F 13/082 |
| 2022/0032222 | A1* | 2/2022 | Park | F24F 13/08 |
| 2022/0212133 | A1* | 7/2022 | Kim | H02J 7/02 |

FOREIGN PATENT DOCUMENTS

| | | | | |
|---|---|---|---|---|
| CN | 1752617 | 3/2006 | | |
| CN | 206242858 | 6/2017 | | |
| CN | 107461812 | 12/2017 | | |
| CN | 107816789 | 3/2018 | | |
| CN | 108895538 | 11/2018 | | |
| CN | 208579428 | 3/2019 | | |
| CN | 109838851 | 6/2019 | | |
| CN | 112902349 A * | 6/2021 | | B01D 46/0049 |
| EP | 3211345 A1 * | 8/2017 | | A61L 2/22 |
| EP | 3677787 | 7/2020 | | |
| KR | 20170040163 | 4/2017 | | |
| KR | 20190075721 | 7/2019 | | |
| KR | 10-2021391 | 9/2019 | | |
| WO | WO 2015/155855 | 10/2015 | | |

OTHER PUBLICATIONS

Office Action in Chinese Appln. No. 202110776385.0, dated Sep. 2, 2022, 17 pages (with English translation).

Office Action in Chinese Appln. No. 202110776385.0, mailed on Apr. 14, 2023, 16 pages (with English translation).

Extended European Search Report in European Appln. No. 21184810.6, dated Dec. 10, 2021, 6 pages.

* cited by examiner

AIR CLEANER

CROSS-REFERENCE TO RELATED APPLICATION

This application claims priority to and the benefit of Korean Patent Application No. 10-2020-0085469, filed on Jul. 10, 2020, the disclosure of which is incorporated herein by reference in its entirety.

BACKGROUND OF THE DISCLOSURE

Field of the Disclosure

The present disclosure relates to an air cleaner, and more particularly, to an air cleaner including a whirlwind preventing structure disposed between blowing devices composed of a plurality of stages.

Related Art

An air cleaner is a device that intakes and purifies contaminated air and then discharges purified air. For example, the air cleaner may include a blowing device for introducing external air into the air cleaner and a filter capable of filtering dust and bacteria, for example.

Generally, the air cleaner is configured to purify an indoor space, such as a home or an office. According to the air cleaner in the related art, there is a problem that a capacity thereof is limited, and thus, purification of air in an entire indoor space is limited. Accordingly, there is a problem that air around the air cleaner is purified whereas air in a space away from the air cleaner is not purified.

In addition, since the air purified inside the air cleaner is discharged only in one direction, that is, in an upward direction, air around the air cleaner can be purified, while the purified air cannot flow to a space away from the air cleaner, and hence, there is a problem in that the air cleaning function is limited.

In order to solve this problem, research on an air cleaner having blowing devices stacked in a plurality of stages in an up-down direction is in progress. Such an air cleaner may include a plurality of blowing devices each including a blower fan, an air inlet, and an air outlet, and the plurality of blowing devices may be stacked on each other in the up-down direction. Such an air cleaner has an advantage in that the blowing capacity is increased, and the air is intaken and discharged in more various directions, so that ambient air can be easily purified even when a person is sitting or standing in the indoor space.

However, such an air cleaner has a problem in that air discharged from a blowing device located at a lower portion is blown upward strongly to generate whirlwind, and the discharged clean air is introduced into a blowing device located at an upper portion.

And, as the amount of air flowing upward increases, there is a problem in that the purified air cannot be circulated farther away.

In addition, when a whirlwind occurs, there is a problem in that the whirlwind acts as a resistance element that inhibits an inflow of unpurified external air into the blowing device located at the upper portion and thus the flow amount of the air is reduced.

In order to solve this problem, Korean Patent Registration Publication No. 10-2021391 discloses a partition plate that is disposed between a plurality of blowing devices to divert a flow direction of air.

However, in the case of the above-described related art, since a flow amount of air colliding with the partition plate and diverting the flow direction to the side is relatively smaller than a flow amount of air rising outward with respect to a radial direction, it is not possible to sufficiently divert the direction of the discharged upward flow, so the air rises in a substantially diagonal direction and is discharged, and a whirlwind is generated (see FIGS. 8A and 8B).

If a height of the partition plate is lowered in order to increase the flow amount of air colliding with the partition plate and diverting the direction of the air to the side, a problem may occur in which an area through which the air is discharged becomes narrow.

RELATED ART DOCUMENT

Patent Document

Korea Patent Registration Publication No. 10-2021391 (Published date: Sep. 16, 2019)

SUMMARY

The present disclosure provides an air cleaner capable of preventing a whirlwind so as to prevent clean air discharged from a blowing device from flowing back into the blowing device.

The present disclosure also provides an air cleaner capable of circulating clean air discharged from a blowing device to a greater distance.

The present disclosure also provides an air cleaner capable of preventing the problem that unpurified external air is prevented from flowing into a blowing device located at an upper portion, and improving an amount of intake air into the air cleaner and an amount of discharged air from the air cleaner.

Technical objects to be achieved by the present disclosure are not limited to the aforementioned technical objects, and other technical objects not described above may be evidently understood by a person having ordinary skill in the art to which the present disclosure pertains from the following description.

In an aspect, an air cleaner is provided, and the air cleaner includes: a first blowing device having a first inlet formed in a lower circumferential surface thereof and a first outlet formed in an upper surface thereof in a circumferential direction; a second blowing device disposed above the first blowing device and having a second inlet formed in a lower circumferential surface thereof; and a partition plate disposed between the first outlet and the second blowing device and guiding air discharged from the first outlet to flow in a radially outward direction. The first blowing device includes: a case forming the first inlet and opened in an upper side; a discharge guide device disposed in the opened upper side of the case and forming the first outlet in the circumferential direction; a first fan disposed inside the case and forming an air flow from the first inlet to the first outlet; and a splitter disposed between the partition plate and a discharge guide device, and extending upward from the discharge guide device in a radial direction of the discharge guide device to separate an air flow discharged from the first outlet and guide the air flow in the radially outward direction. In this case, the splitter may separate an air flow discharged from the first outlet between the partition plate and the discharge guide device and guide the in the radially outward direction. In particular, a flow amount of air colliding with a configuration for diverting a direction of the discharged air increases, and thus, there are advantages in that the phenomenon in which the flow is not diverted in the radial outward direction is improved, the whirlwind phenomenon is prevented, the clean air can be circulated further, and the ratio of external air that has not undergone a cleaning operation being suctioned into the second blower is increased.

The discharge guide device may include: a body inner wall forming an inner circumferential surface of the discharge guide device; and a body outer wall forming an outer circumferential surface of the discharge guide device and forming the first outlet between the body inner wall and the body outer wall, and one end of the splitter may be positioned between the body inner wall and the body outer wall.

The one end of the splitter may extend in the circumferential direction to form a ring shape.

The discharge guide device may include a plurality of discharge grilles forming a plurality of the first outlets in the circumferential direction, and the one end of the splitter is inserted between the plurality of the discharge grilles.

In the one end of the splitter, a concave-convex portion may be formed in which a portion corresponding to the discharge grille is concave and a portion corresponding to the first outlet is convex, and the discharge guide device may further include a groove portion provided between the body outer wall and the body inner wall and partitioning grooves into which the concave-convex portion is inserted. Accordingly, the splitter may be inserted and fixed into the discharge guide device.

A first virtual line extending an outer circumferential end of the first outlet in an up-down direction and the other end of the splitter may extend to an outside of the first virtual line in the radial direction of the discharge guide device. Accordingly, a direction of air flow rising in a diagonal direction may be diverted to the radially outward direction.

A third virtual line extending the outer circumferential surface of the discharge guide device in the up-down direction may be defined, and the other end of the splitter extends to the third virtual line in the radial direction of the discharge guide device. Accordingly, the splitter may not protrude to the outside of the air cleaner, but may have a neat outer appearance.

The other end of the splitter may be positioned between an outer circumferential end of the partition plate and an outer circumferential end of the discharge guide device.

The splitter may include a curved portion formed to be rounded upward, so that a flow of air may be smoothly diverted.

The splitter may have a flat portion extending horizontally in a radially outward direction from the curved portion of the splitter, so that straightness of an air flow in an air discharging direction may improve.

The partition plate may include a curved portion formed to be rounded upward, and a curvature formed by the curved portion of the splitter may be greater than a curvature formed by the curved portion of the partition plate. Accordingly, the flow of air discharged from the first outlet and passing through the second channel formed between the partition plate and the splitter, and the flow of air passing through the first channel formed between the splitter and the outer circumferential end of the discharge guide device may be smoothly diverted in the radial outward direction.

The partition plate may be formed to be rounded upward from an inner circumferential surface of the discharge guide device and extend in the radially outward direction of the discharge guide device.

A third virtual line extending an outer circumferential surface of the discharge guide device in the up-down direction may be defined, and the partition plate may extend to an outside of the third virtual line in the radial direction of the discharge guide device. Accordingly, it is possible to block the air discharged from the first blowing device from flowing in an upper diagonal direction.

The partition plate may extend in the radially outward direction to an outside of the lower circumferential surface of the second blowing device.

An outer circumferential end of the partition plate may be bent downward. Accordingly, the flow direction of the air may be diverted so that the air discharged from the first blowing device is not intaken into the second blowing device.

A flow rate of air between the splitter and the outer circumferential surface of the discharge guide device may be greater than a flow rate of air between the splitter and the partition plate.

The first fan may be a centrifugal fan that allows air to flow obliquely in the radially outward direction toward an upward direction.

In another aspect, there is provided an air cleaner, and the air cleaner includes: a first blowing device having a first inlet formed in a lower circumferential surface and a first outlet formed in an upper surface thereof in a circumferential direction; a second blowing device disposed above an upper side of the first blowing device and having a second inlet formed in a lower circumferential surface thereof; and a partition plate disposed between the first outlet and the second blowing device, is formed to be rounded upward from the first outlet, extends in a radially outward direction of the first outlet, and discharges, in a radial outward direction, air that is discharged from the first outlet. The first blowing device includes: a case forming the first inlet and opened in an upper side; a discharge guide device disposed at an opened upper side of the case and forming the first outlet in a circumferential direction; and a first fan disposed inside the case and forming an air flow from the first inlet to the first outlet. The partition plate extends in a radially outward direction to an outside of an outer circumferential surface of the discharge guide device and/or an outside of a lower circumferential surface of the second blowing device.

The details of other embodiments are included in the detailed description and drawings.

The air cleaner according to the embodiment of the present disclosure has one or more advantages as follows.

First, since the splitter separates air discharged from the first blowing device and diverts the flow direction of the air to a radially outward direction, there is an advantage in that a reduction in flow rate is minimized, a whirlwind is prevented, and clean air is prevented from flowing into an upper blowing device.

Second, since the splitter diverts the flow of air discharged from the first blowing device to the radially outward direction, there is an advantage in that an upward flow is reduced and the clean air can be circulated farther away.

Third, since the splitter prevents the clean air from flowing into the second blowing device, there is an advantage in that an amount of unpurified external air to be intaken into and discharged from a blowing device can increase.

The effects of the present disclosure are not limited to the above-mentioned effects, and other effects not mentioned will be clearly understood by those skilled in the art from the description of the claims.

BRIEF DESCRIPTION OF THE DRAWINGS

FIG. 7A is a cross-sectional view taken along line X-X' in FIG. 3 of the embodiment without a splitter 410, and FIG. 7B is a view showing a part "A" of FIG. 7A.

FIG. 8A is an enlarged view of the outlet of FIG. 7B, and FIG. 8B is an overall view of a model to which FIG. 7B is applied.

FIG. 9A is a cross-sectional view taken along line X-X' in FIG. 3, and FIG. 9B is a view showing a part "A" of FIG. 9A.

FIG. 10A is an enlarged view of the outlet side of FIG. 9B, and FIG. 10B is an overall view of a model to which FIG. 9B is applied.

FIG. 12A is the result of a simulation in a case where the protruding width w5 of the partition plate of FIG. 11 is 10 mm, FIG. 12B is the result of a simulation in a case where the protruding width w5 is 20 mm, and FIG. 12C is the result of a simulation in a case where the protruding width w5 is 40 mm.

DESCRIPTION OF EXEMPLARY EMBODIMENTS

Figure 1:
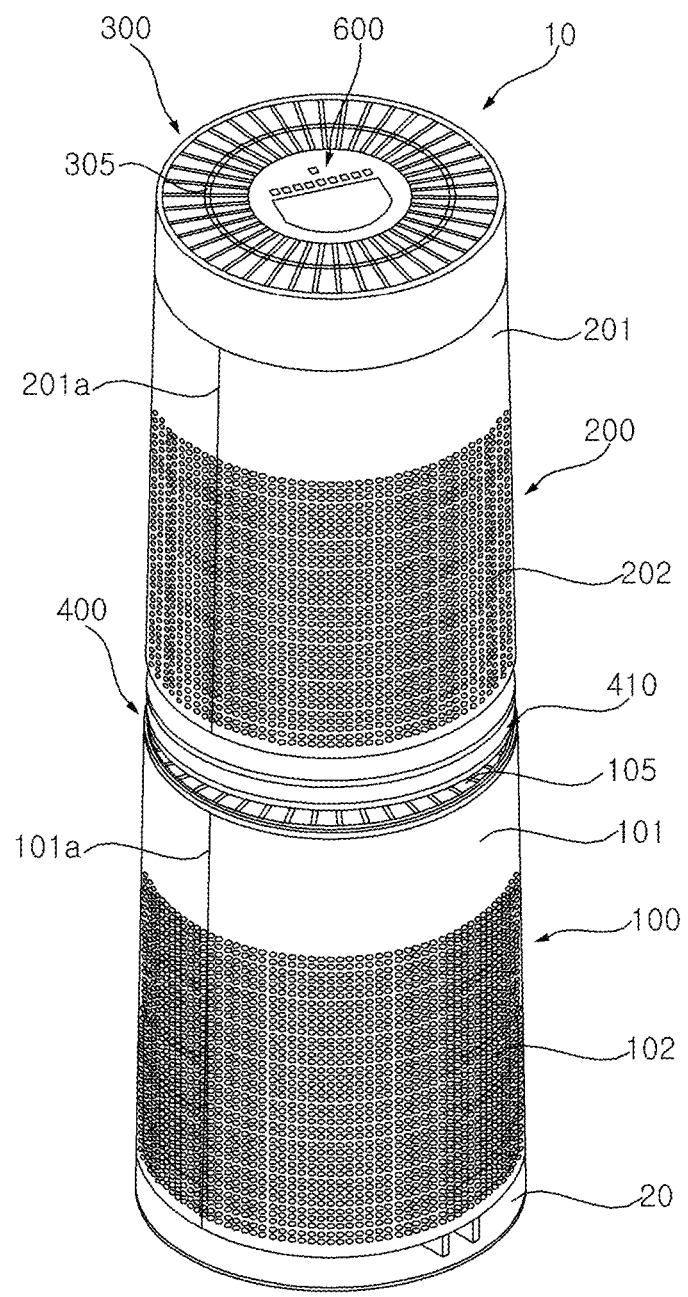
FIG. 1 is a perspective view showing an outer appearance of an air cleaner according to an embodiment of the present disclosure.

Hereinafter, some embodiments of the present disclosure will be described in detail with reference to exemplary drawings. Regarding the reference numerals assigned to the components in the drawings, it should be noted that the same components may be designated by the same reference numerals, wherever possible, even though they are shown in different drawings. In describing an embodiment of the present disclosure, if it is determined that the detailed description of a related known function or construction renders the scope of the present invention unnecessarily ambiguous, the detailed description thereof will be omitted.

It will be understood that, although the terms first, second, A, B, (a), (b), etc. may be used herein to describe various elements of the present invention. These terms are only used to distinguish one element from another element and necessity, order, or sequence of corresponding elements are not limited by these terms. It will be understood that when one element is referred to as being "connected to", "coupled to", or "linked to" another element, one element may be "connected to", "coupled to", or "linked to" another element via a further element although one element may be directly connected to or directly linked to another element.

FIG. 1 is a perspective view showing an appearance of an air cleaner according to an embodiment of the present disclosure.

In FIG. 1, an up-down direction is defined as an axial direction, and a left-right direction is defined as a radial direction. The axial direction may correspond to a central axis direction of a first fan 160 and a second fan 260 to be described later, that is, a motor shaft direction of a fan. And, the radial direction may refer to a direction perpendicular to the axial direction.

In addition, a circumferential direction may refer to a virtual circle direction which is formed when rotating about the axial direction and having a distance of the radial direction as a rotational radius.

Referring to FIG. 1, an air cleaner 10 according to an embodiment of the present disclosure may include blowing devices 100 and 200 for generating an air flow, and a flow diverting device 300 for diverting a discharging direction of the air flow generated by the blowing devices 100 and 200.

The blowing devices 100 and 200 may include a first blowing device 100 for generating a first air flow and a second blowing device 200 for generating a second air flow.

The first blowing device 100 and the second blowing device 200 may be arranged in the up-down direction. For example, the second blowing device 200 may be disposed above the first blowing device 100. In this case, the first air flow forms an air flow for intaking indoor air existing in a lower side of the air cleaner 10, and the second air flow may form an air flow for intaking indoor air existing in an upper side of the air cleaner 10.

The air cleaner 10 may include cases 101 and 201 that form an outer appearance.

In detail, the cases 101 and 201 may include a first case 101 forming an outer appearance of the first blowing device 100. The first case 101 may have a cylindrical shape. In addition, an upper portion of the first case 101 may be configured to have a diameter smaller than a diameter of a lower portion thereof. That is, the first case 101 may have a truncated cone shape. The first case 101 may include a first separation portion 101a at which two parts constituting the first case 101 are coupled or separated.

A first inlet 102 through which air is intaken may be formed in the first case 101. The first inlet 102 may include a through hole formed through at least a portion of the first case 101. The first inlet 102 may be formed in plurality.

The plurality of first inlets 102 may be uniformly formed in a circumferential direction along an outer circumferential surface of the first case 101 so that air can be intaken in any direction with respect to the first case 101. The first inlet 102 may be formed in a lower circumferential surface of the first case 101. Accordingly, through the first inlet 102, air may be intaken in a 360 degree direction based on a vertical center line passing through the inner center of the first case 101. Air intaken through the first inlet 102 may flow in a substantially radial direction from the outer circumferential surface of the first case 101. As described above, since the first case 101 is configured in a cylindrical shape and the plurality of first inlets 102 are formed along the outer circumferential surface of the first case 101, an intake amount of air may increase.

The first blowing device 100 may further include a base 20 provided under the first case 101 and placed on the ground. The base 20 may be positioned to be spaced downward from a lower end of the first case 101. A base inlet 103 (see FIG. 2) may be formed in a space between the first case 101 and the base 20.

A plurality of first outlets 105 may be formed in an upper portion of the first blowing device 100. The first outlet 105 may be formed in a first discharge grille 195 of a first discharge guide device 190 (see FIG. 4) provided in the first blowing device 100. The first discharge guide device 190 may form an outer appearance of an upper end portion of the first blowing device 100. That is, the upper side of the first case 101 may be opened, and the discharge guide device 190 forming the first outlet 105 may be disposed in the opened upper side of the first case 101. Air discharged through the first outlet 105 may flow upward in the axial direction.

The case 101,201 may include a second case 201 that forms an outer appearance of the second blowing device 200. The second case 201 may have a cylindrical shape. In addition, an upper portion of the second case 201 may be configured to have a diameter smaller than a diameter of a lower portion thereof. That is, the second case 201 may have a truncated cone shape. The second case 201 may include a first separation portion 201*a* at which two parts constituting the second case 201 are coupled or separated.

A diameter of a lower end portion of the second case 201 may be smaller than a diameter of an upper end portion of the first case 101. Accordingly, in view of the overall shape of the cases 101 and 201, a lower cross-sectional area of each of the cases 101 and 201 is formed to be larger than an upper cross-sectional area thereof, and thus, the air cleaner 10 can be stably supported on the ground.

A second inlet 202 through which air is intaken may be formed in the second case 201. The second inlet 202 may include a through hole formed through at least a portion of the second case 201. The second inlet 202 may be formed in plurality.

The plurality of second inlets 202 may be uniformly formed along an outer circumferential surface of the second case 201 in the circumferential direction so that air can be intaken in any direction with respect to the second case 201. The second inlet 202 may be formed in a lower circumferential surface of the second case 201. That is, air may be intaken in a 360 degree direction with respect to a vertical center line passing through the inner center of the second case 201.

As described above, since the second case 201 is configured in a cylindrical shape and the plurality of the second inlets 202 are formed along the outer circumferential surface of the second case 201, an amount of air intake may increase.

Air intaken through the second inlet 202 may flow in a substantially radial direction from the outer circumferential surface of the second case 201.

The air cleaner 10 may include a partition device 400 provided between the first blowing device 100 and the second blowing device 200. By the partition device 400, the second blowing device 200 may be positioned to be spaced apart from the upper side of the first blowing device 100.

Also, a splitter 410 may be disposed between the partition device 400 and the first outlet 105. The air discharged from the first outlet 105 may be separated by the splitter 410. A description of the partition device 400 and the splitter 410 will be described later with reference to the drawings.

The flow diverting device 300 may be installed above the second blowing device 200. Based on an air flow, an air flow path of the second blowing device 200 may communicate with an air flow path of the flow diverting device 300. The air having passed through the second blowing device 200 may pass through the air flow path of the flow diverting device 300 and be discharged to the outside through a second outlet 305. The second outlet 305 may be formed in an upper end portion of the flow diverting device 300.

The flow diverting device 300 may be provided to be movable. As shown in FIG. 1, the air flow diverting device 300 may be in a lying state or in an inclined standing state.

In addition, a display device 600 for displaying operation information of the air cleaner 10 may be provided at an upper portion of the flow diverting device 300. The display device 600 may move together with the flow diverting device 300.

Figure 2:
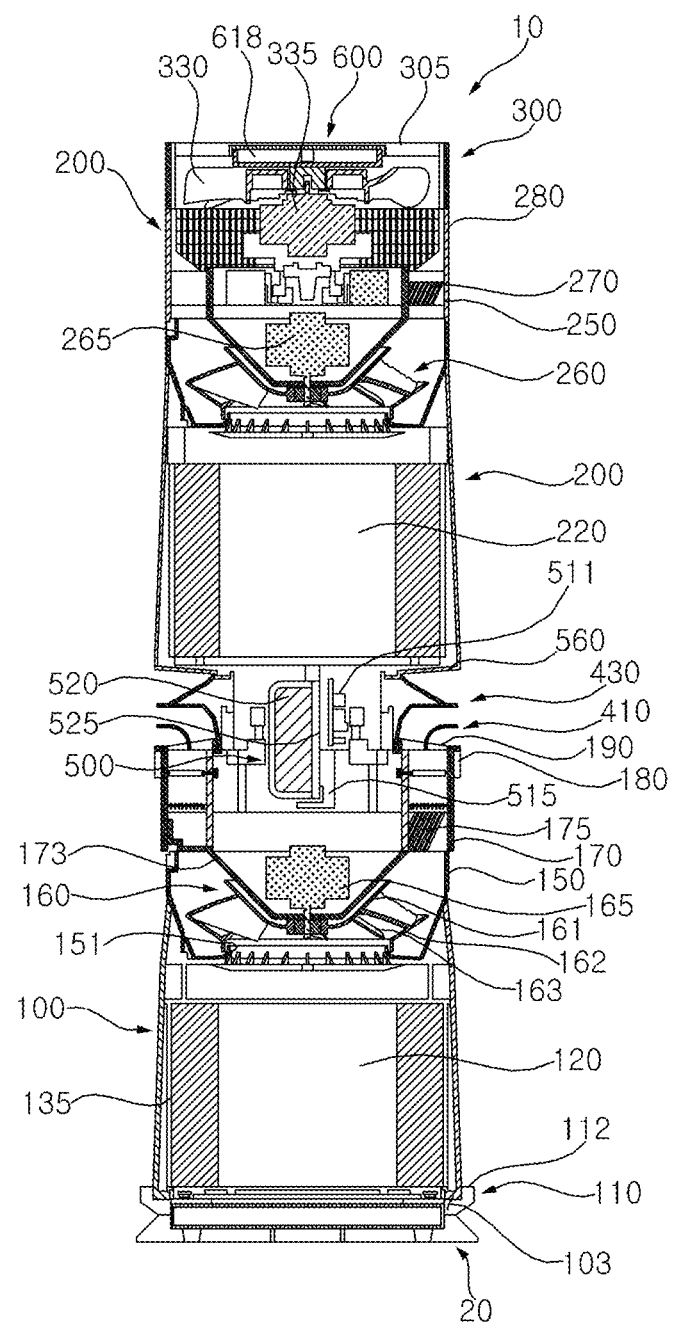
FIG. 2 is a cross-sectional view of FIG. 1.

FIG. 2 is a cross-sectional view of FIG. 1.

Hereinafter, the first blowing device 100 will be described.

Referring to FIG. 2, the first blowing device 100 according to an embodiment of the present disclosure may include the base 20 and the intake grille 110 disposed above the base 20. Between the base 20 and the intake grille 110, a base inlet 103 forming an air intake space may be formed.

Air intaken through the base inlet 103 may pass through a first filter member 120. The first filter member 120 is provided in a cylindrical shape and may have a filter surface for filtering air.

The first filter member 120 may have a cylindrical shape with a top opened. Air may be introduced into the first filter member 120 through an outer circumferential surface of the first filter member 120, and may be discharged from the first filter member 120 through the filter hole 122. The first blowing device 100 may further include a first filter support 135 forming a mounting space for the first filter member 120.

In the mounting space, the first filter member 120 may be detachably mounted. The mounting space may be provided in a cylindrical shape corresponding to the shape of the first filter member 120. In the process of passing through the first filter member 120, impurities such as fine dust in the air may be filtered out. Since the first filter member 120 has the cylindrical shape, air may be introduced in any direction with respect to the first filter member 120. Accordingly, an air filtering area may increase.

The first blowing device 100 may further include a first fan housing 150 installed at the outlet side of the first filter member 120. A first fan 160 may be accommodated in the first fan housing 150.

A first fan introducing portion 151 which guides introduction of air into the first fan housing 150 may be included in the lower portion of the first fan housing 150. A grille is provided in the first fan introducing portion 151, so that this may prevent a finger of a user from being inserted into the first fan housing 150 when the first filter member 120 is separated.

The first fan 160 is placed above the first fan inlet 151. For example, the first fan 160 may include a centrifugal fan which introduces air in the axial direction and then discharges air outward and upward with respect to the radial direction.

In detail, the first fan 160 may include a hub 161 to which a rotational shaft of a first fan motor 165, which is a centrifugal fan motor, may be coupled, a shroud 162 disposed to be spaced apart from the hub, and a plurality of blades 163 disposed between the hub and the shroud. The first fan motor 165 may be coupled to the upper side of the first fan 160.

The air having passed through the first filter member 120 may be introduced to the first fan housing 150 through the first fan introducing portion 151 with the air flowing in the upward direction. The air may flow in the axial direction of the first fan 160.

In this case, the blade 163 of the first fan 160 may have a shape that allows the air flowing in the axial direction to flow upward with respect to the radial direction. For example, the blade 163 may extend to be inclined outward and upward with respect to the axial direction to correspond to a flow direction of air.

The first blowing device 100 may further include a first air guide device 170 coupled to the upper side of the first fan 160 to guide the flow of air having passed through the first fan 160.

The first air guide device 170 may have a cylindrical shape, and a flow path through which air flows may be formed therein. The first air guide device 170 may include an inner wall (not shown) having a cylindrical shape and an outer wall (not shown) having a cylindrical shape surrounding the inner wall, and a first air flow path (now shown) through which air flows may be formed between an outer circumferential surface of the inner wall and an inner circumferential surface of the outer wall.

The first air guide device 170 may include a guide rib 175 disposed in the first air flow path (not shown). The guide rib 175 may extend from the outer circumferential surface of the inner wall (not shown) to the inner circumferential surface of the outer wall (not shown). A plurality of the guide ribs 175 may be disposed to be spaced apart from each other. The plurality of guide ribs 175 may perform a function of guiding upwardly the air introduced into the first air flow path (not shown) of the first air guide device 170 through the first fan 160.

The guide rib 175 may extend to be inclined upward from the lower portion of the first air guide device 170. For example, the guide rib 175 may be formed to be round, and may guide air to flow obliquely upward.

The first air guide device 170 may further include a motor accommodating portion 173 that extends downward from the inner wall (not shown) and accommodates the first fan motor 165. The motor accommodating portion 173 may have a bowl shape, a diameter of which is gradually reduced in a downward direction. The shape of the motor accommodating portion 173 may correspond to the shape of the hub 161.

The first fan motor 165 may be supported at an upper side of the motor accommodating portion 173. In addition, a rotational shaft (not shown) of the first fan motor 165 may extend downward from the first fan motor 165 and be coupled to a shaft coupling portion (not shown) of the hub 161 through a lower surface portion of the motor accommodating portion 173.

Hereinafter, the configuration of the second blowing device 200 will be described.

The second blowing device 200 may include a second filter member 220, a second fan housing 250, a second fan 260, and a second fan motor 265. Since these configurations are similar to the first filter member 120, the first fan housing 150, the first fan 160, and the first fan motor 165 provided in the first blowing device 100, the description of the first blowing device 100 may be referred to for the description of the aforementioned configurations.

The second blowing device 200 may further include a third air guide device 270 coupled to an upper side of the second fan 260 to guide the flow of air having passed through the second fan 260. Since the third air guide device 270 is similar to the configuration of the first air guide device 170, the description of the first air guide device 170 may be referred to.

The third air guide device 270 may include a guide device for guiding movement of the flow diverting device 300. The guide device may include a first rack and a shaft guide groove.

The second blowing device 200 may be provided with a second discharge guide device 280 installed at an upper side of the third air guide device 270 and guiding a flow of air having passed through the third air guide device 270.

Above the second discharge guide device 280, the flow diverting device 300 may be provided to be movable. The flow diverting device 300 may include a third fan 330. The third fan 330 may guide air having passed through the third air guide device 270 to be discharged to the outside of the air cleaner 10. A third fan motor 335 may be coupled to the third fan 330.

The third fan 330 may include an axial flow fan or a mixed-flow fan. In detail, when the third fan 330 is the axial flow fan, the third fan may be operated to discharge air, which is introduced in the axial direction through the third air guide device 270, in the axial direction. The air having passed through the third fan 330 may be discharged to the outside through the second outlet 305 located above the third fan 330.

Since the air cleaner 10 is provided with the second outlet 305 together with the first outlet 105 of the first blowing device 100, a discharged amount of air flow is improved and air is discharged in various directions.

A display device 600 displaying operation information of the air cleaner 10 may be provided on the upper surface of the air cleaner 10. The display device 600 may include a display PCB 618. The display PCB 618 may be installed in a space between the upper surface of the air cleaner 10 and the third fan 330.

The first fan motor 165 and the second fan motor 265 may be arranged in a line with respect to the longitudinal direction of the air cleaner 10. In addition, the second fan motor 265 and the third fan motor 335 may be arranged in a line with respect to the longitudinal direction of the air cleaner 10.

The flow diverting device 300 may further include a rotation guide device for guiding rotation of the flow diverting device 300 in the left-right direction and in the up-down direction. The rotation guide device may include various gears and motors for rotation in the left and right direction and rotation in the up-down direction.

Figure 3:
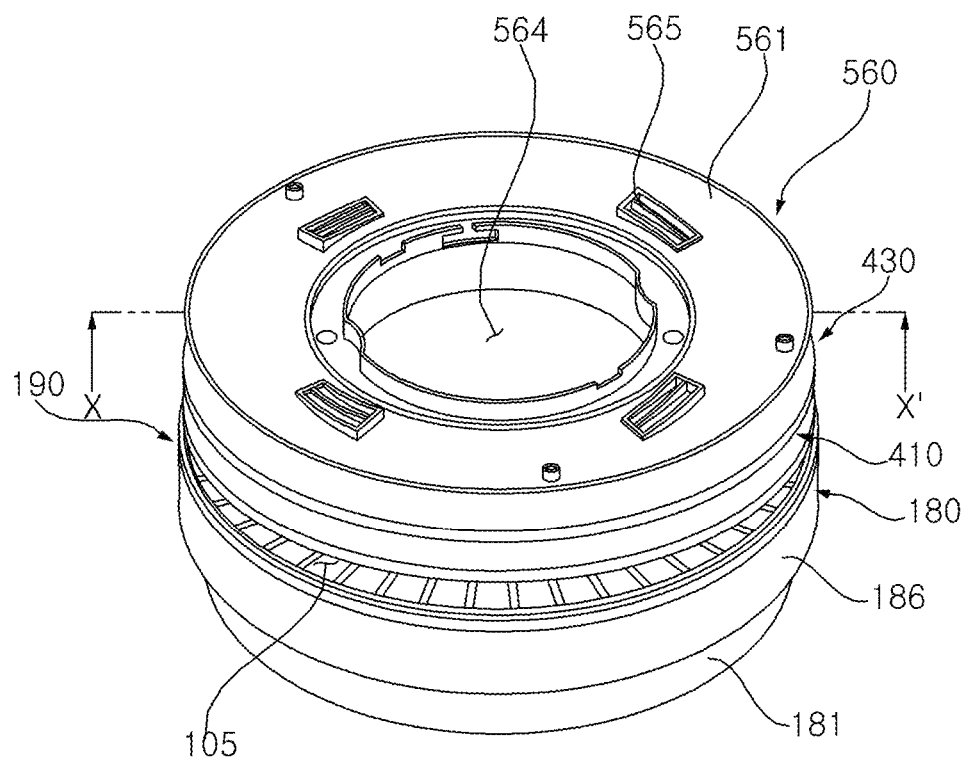
FIGS. 3 and 4 are views showing an air flow according to an embodiment of the present disclosure.
Figure 4:
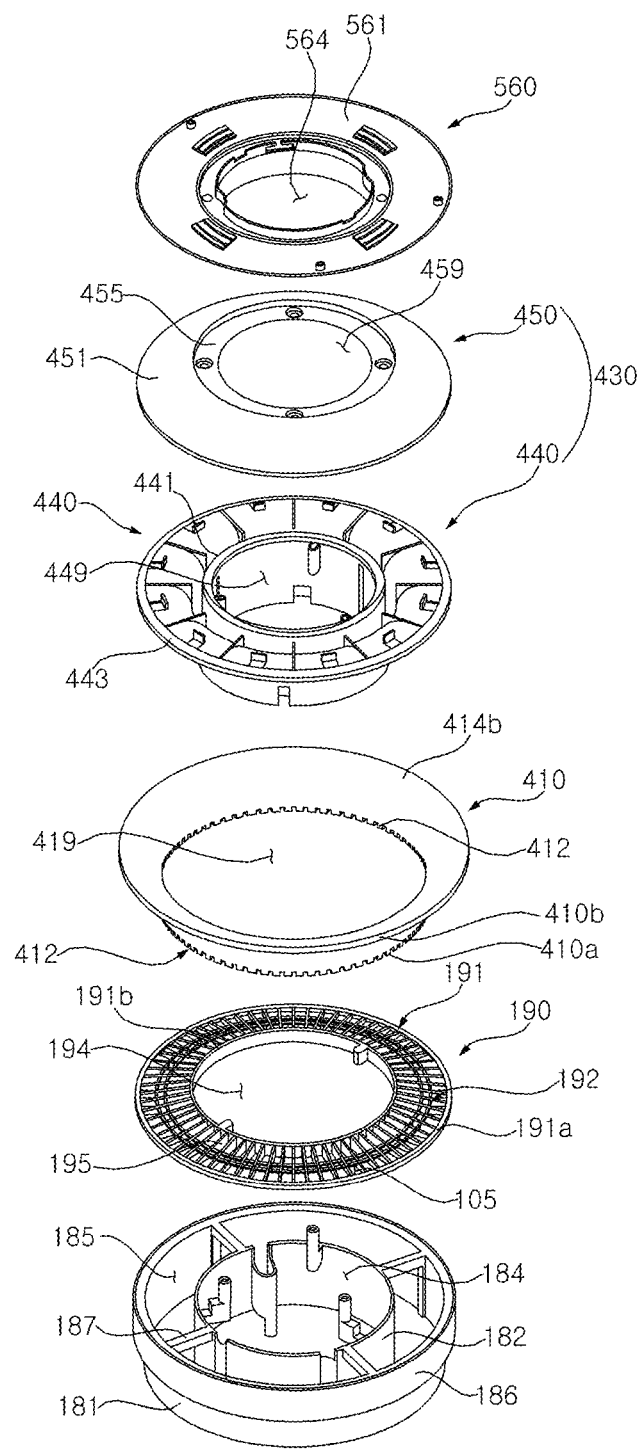

FIG. 3 is a perspective view showing the configuration of a partition plate 430 and a splitter 410 according to an embodiment of the present disclosure, and FIG. 4 is an exploded perspective view showing a partition plate according to an embodiment of the present disclosure and a configuration coupled to the partition plate.

Referring to FIGS. 3 and 4, the first blowing device 100 according to an embodiment of the present disclosure may further include a second air guide device 180 that is coupled to the upper side of the first air guide device 170 and guides air having passed through the first air guide device 170 to the first discharge guide device 190.

The second air guide device 180 may include a first guide wall 181 having a substantially cylindrical shape, and a second guide wall 182 positioned inside the first guide wall 181 and having a substantially cylindrical shape. The first guide wall 181 may be disposed to surround the second guide wall 182.

A second air flow path 185 through which air flows may be formed between an inner circumferential surface of the first guide wall 181 and an outer circumferential surface of the second guide wall 182. Air flowing through the first air flow path (not shown) of the first air guide device 170 may pass through the second air flow path 185 and flow upward. The second air flow path 185 may be referred to as a "discharge flow path". In addition, the first outlet 105 may be disposed at an upper side of the second air flow path 185.

The second air guide device 180 may further include a wall support 187 extending from the inner circumferential surface of the first guide wall 181 to the outer circumferential surface of the second guide wall 182. By the wall support part 187, the first and second guide walls 181 and 182 may be stably coupled. The wall support 187 may be provided in plurality, and may support the first discharge guide device 190.

A first space portion 184 in which at least a portion of the PCB device 500 is accommodated may be formed inside the second guide wall 182 having a cylindrical shape. The PCB device may include a main PCB 511 and a power supply 520, which receives commercial power and supplies the power to a plurality of components in the main PCB and the air cleaner 10.

The second air guide device 180 may include a bent portion 186 extending outward from an upper portion of the first guide wall 181. The bent portion 186 may be configured to extend in a radially outward direction from the upper end of the first guide wall 181 and be bent downward. For example, the bent portion 186 may have a substantially eaves shape (see FIG. 7B).

The first blowing device 100 may further include a first discharge guide device 190 which is disposed on an upper side of the second air guide 180, that is, an outlet side of air flow relative to the air flow, and guides the air discharged to the outside of the air cleaner 10.

The first discharge guide device 190 may include a first discharge body 191 forming a second space portion 194 in a substantially central portion thereof. The first discharge body 191 may include a body outer wall 191*a* forming an outer circumferential surface and a body inner wall 191*b* forming an inner circumferential surface. The body outer wall 191*a* may be disposed to surround the body inner wall 191*b*. Due to the configuration of the body outer wall 191*a* and the body inner wall 191*b*, the first discharge body 191 may have an annular shape.

The second space portion 194 may be formed inside the body inner wall 191*b*. At least a portion of the PCB device 500 (see FIG. 2) may be accommodated in the second space portion 194. The second space portion 194 may be formed above the first space portion 184 and form an installation space portion in which the PCB device 500 is installed, together with the first space portion 184.

The first discharge body 191 may include a first discharge grille 195. The first discharge grille 195 may extend in the radially outward direction from the body inner wall 191*b* of the first discharge body 191 toward the body outer wall 191*a*.

A plurality of the first discharge grilles 195 may be provided, and the first outlet 105 through which air may be discharged to the outside may be formed between the plurality of first discharge grilles 195. The plurality of first discharge grilles 195 are disposed above the second air flow path 185, and the air having passed through the second air flow path 185 may flow to the side of the first discharge grille 195 and may be discharged through the first outlet 105.

An air flow path formed from the second air flow path 185 to the first outlet 105 may be referred to as a "discharge flow path".

The second blowing device 200 may include a second filter member 220, a supporting device for supporting a lower portion of the second filter member 220, and a lever device provided under the supporting device. The second blowing device may further include a lever supporting device 560 for supporting the second filter member 220 or the lever device of the second blowing device 200. The lever supporting device 560 has a substantially annular shape. The lever supporting device 560 may form a part of a lower circumferential surface of the second blowing device. The lever supporting device 560 may include a third space portion 564 defining an installation space in which the PCB device 500 can be located. The third space portion 564 may be formed in a substantially central portion of the lever supporting device 560.

The lever supporting device 560 may include a lever supporting body 561 having an annular shape. The lever supporting body 561 may extend from the inner circumferential surface toward the outer circumferential surface thereof to be slightly inclined upward with respect to the axial direction. The lever supporting device 560 may further include a supporting projection 566 protruding upward from the inner circumferential surface of the lever supporting body 561 to support the lever device of the second blowing device 200.

A partition device 400 may be provided between the first blowing device 100 and the second blowing device 200. The partition device 400 may include a partition plate 430 for separating or blocking an air flow generated from the first blowing device 100 and an air flow generated from the second blowing device 200. By the partition plate 430, the first and second blowing devices 100 and 200 may be disposed to be spaced apart from each other in the up-down direction.

That is, a separation space in which the partition plate 430 is located may be formed between the first and second blowing devices 100 and 200. The first discharge guide device 190 of the first blowing device 100 may be located at the lower end of the separation space, and the lever supporting device 560 of the second blowing device 200 may be located at the upper end of the separation space.

The air discharged from the first outlet 105 is guided by the partition plate 430 to flow to the outside of the air cleaner 10, and it may be possible to prevent an excessive amount of air from inflowing to the side of the second blowing device 200.

The partition plate 430 may include a first plate 440 and a second plate 450 coupled to the first plate 440. The second plate 450 may be provided on or at an upper side of the first plate 440. In addition, the first plate 440 may extend in a rounded manner in the upward direction, and the second plate 450 may extend in a rounded manner in the downward direction.

The first plate 440 may include a plate inner wall 441 having a substantially annular shape and an plate outer wall 443 disposed to surround the plate inner wall 441. A fourth space portion 449 may be formed in a central portion of the plate inner wall 441. The fourth space portion 449 may provide an installation space in which at least a portion of the PCB device 500 is located.

The second plate 450 may include a second plate body 451 having a substantially annular shape. In addition, the second plate 450 may further include a plate seating portion 455 protruding inward of the radial direction from an inner circumferential surface of the second plate body 451. The plate seating portion 455 is configured to be recessed downward from an upper end of the second plate body 451, and may support the lever supporting device 560.

A fifth space portion 459 may be formed in a central portion of the plate seating portion 455. The fifth space portion 459 may provide an installation space in which at least a portion of the PCB device 500 is located. The fifth space portion 459 may be aligned under the fourth space portion 564.

The splitter 410 may be disposed between the first discharge guide device 190 and the partition plate 430.

The splitter 410 may extend in a rounded manner toward the upper side of the first discharge guide device 190. The extended portion may extend in the radially outward direction about the axis. The splitter 410 may have an annular shape. The splitter 410 may have a wider circumference from the lower side to the upper side.

At the same height, a circumference of the ring shape formed by the splitter 410 may be larger than a circumference of the ring shape formed by the first plate 440. The splitter 410 may be disposed to be spaced apart from the first plate 440. The splitter 410 may surround a portion of the cylindrical surface of the first plate 440. The splitter 410 may be formed to be spaced apart from the plate outer wall 443 of the first plate 440. The splitter 410 may have an annular shape surrounding the lower portion of the outer circumferential surface formed by the plate outer wall 443.

One end 410a of the splitter 410 may be formed in a ring shape to contact the first discharge guide device 190. The one end 410a of the splitter 410 may be positioned between the body outer wall 191a and the body inner wall 191b of the first discharge body 191. That is, the ring shape formed by the one end 410a of the splitter 410 may be disposed between the circumferential surface formed by the body outer wall 191a and the circumferential surface formed by the body inner wall 191b.

The one end 410a of the splitter 410 may be coupled in a way that is inserted between the discharge grilles 195 of the first discharge guide device 190. For example, in the one end 410a of the splitter 410, a concave-convex portion 412 may be formed in which a portion corresponding to the discharge grille 195 is concave and a portion corresponding to the first outlet 105 formed between the discharge grilles 195 is convex. Also, the concave-convex portions 412 having a concave-convex shape may be fastened in such a way that is inserted between the discharge grilles 195.

In this case, the first discharge guide device 190 may further include a groove portion 192, which is provided between the body outer wall 191a and the body inner wall 191b and formed in a ring shape to contact the inner circumferential surface and the outer circumferential surface of the concave-convex portion 412 to partition grooves into which the concave-convex portion is inserted. In the first discharge guide device 190, an outer first outlet 105a communicating with a first channel 448a is formed between the body outer wall 191a and the groove portion 192 (see FIG. 9B), and an inner first outlet 105b communicating with a second channel 488b may be formed between the body inner wall 191b and the groove portion 192 (see FIG. 9B).

The splitter 410 may separate air flow discharged from the first outlet 105 and directed toward the partition plate 430. The splitter 410 may guide the separated air flow in a radially outward direction of the first outlet 105. The air flow discharged from the first outlet 105 and directed toward the partition plate 430 may be separated into an air flow between the inner circumferential surface of the splitter 410 and the partition plate 430, and an air flow between the outer circumferential surface of the splitter 410 and the body outer wall 191a. By the splitter 410, it is possible to increase the momentum of the air flow in a radially outward direction without reducing the flow rate. Details thereof will be described later.

Meanwhile, the splitter 410 may form a sixth space portion 419 in the center thereof. The sixth space portion 419 may be formed to be surrounded by the inner circumferential surface of the splitter 410. The sixth space portion 419 may be disposed between the second space portion 194 and the fourth space portion 459. The first to sixth space portions 184, 194, 564, 449, 459 and 419 may be aligned in the up-down direction to provide an installation space for the PCB device 500. Also, between the splitter 410 and the partition plate 430 (see FIG. 9B), the sixth space portion 419 may serve as the second channel 448b.

Figure 5:
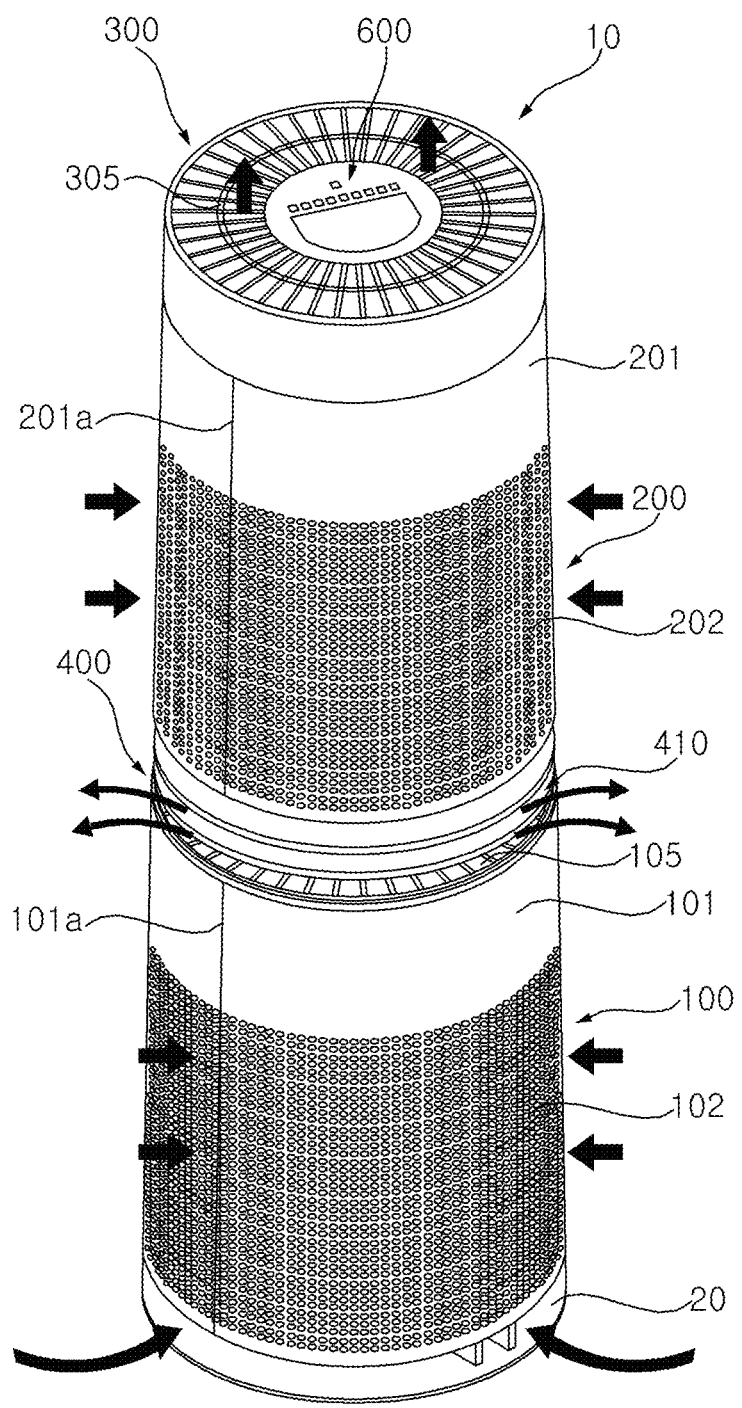
FIG. 5 is a perspective view showing a partition plate, a splitter, and a configuration coupled to the partition plate according to an embodiment of the present disclosure.
Figure 6:
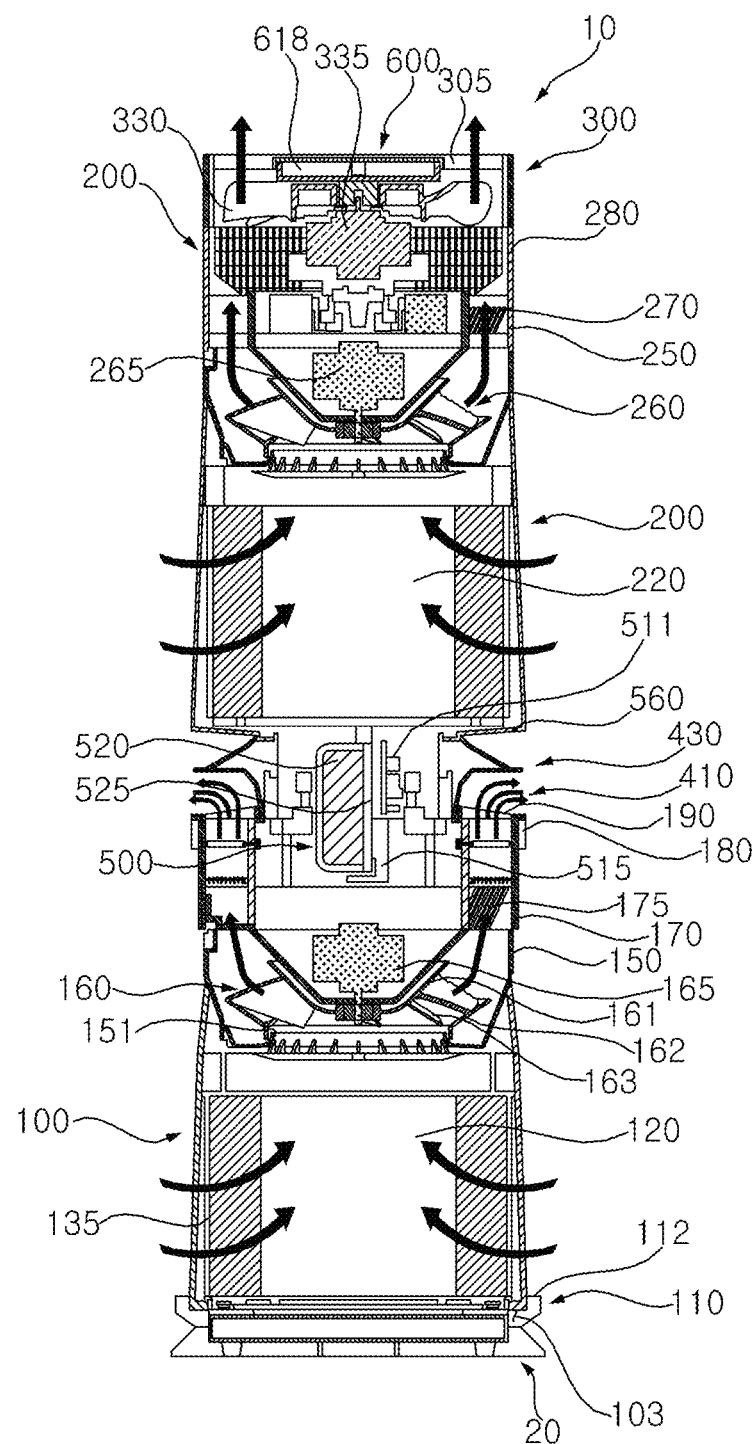
FIG. 6 is an exploded perspective view showing a partition plate, a splitter, and a configuration coupled to the partition plate according to an embodiment of the present disclosure.

FIGS. 5 and 6 are views showing an air flow in an air cleaner according to an embodiment of the present disclosure. Referring to FIGS. 5 and 6, a flow of air according to an embodiment of the present disclosure will be briefly described.

First, a flow of air according to driving of the first blowing device 100 will be described. When a first fan 160 is driven, indoor air may be intaken into a first case 101 through the first inlet 102 and a base inlet 103. The intake air passes through a first filter member 120, and in this process, foreign substances in the air may be filtered out. In addition, while the air passes through the first filter member 120, the air may be intaken and filtered in the radial direction of the first filter member 120 and then may flow upward.

The air having passed through the first filter member 120 flows upward with respect to the radial direction while passing through the first fan 160, and a stable upward flow of the air is achieved while the air passes through the first and second air guide devices 170 and 180. The air having passed through the first and second air guide devices 170 and 180 may pass through the first discharge guide device 190 and flow upward through the first outlet 105.

In this case, the air discharged through the first outlet 105 may be separated by the splitter 410 disposed between the first discharge guide device 190 and the first plate 440 of the partition plate 430. Specifically, the air may be separated into air flowing between the outer circumferential surface of the splitter 410 and the circumference of the first discharge guide device and air flowing between the inner circumferential surface of the splitter 410 and the partition plate 430. The air separated by the splitter 410 may be guided by the splitter 410 and the partition plate 430 to be discharged to the outside of the air cleaner 10.

Figure 9A:
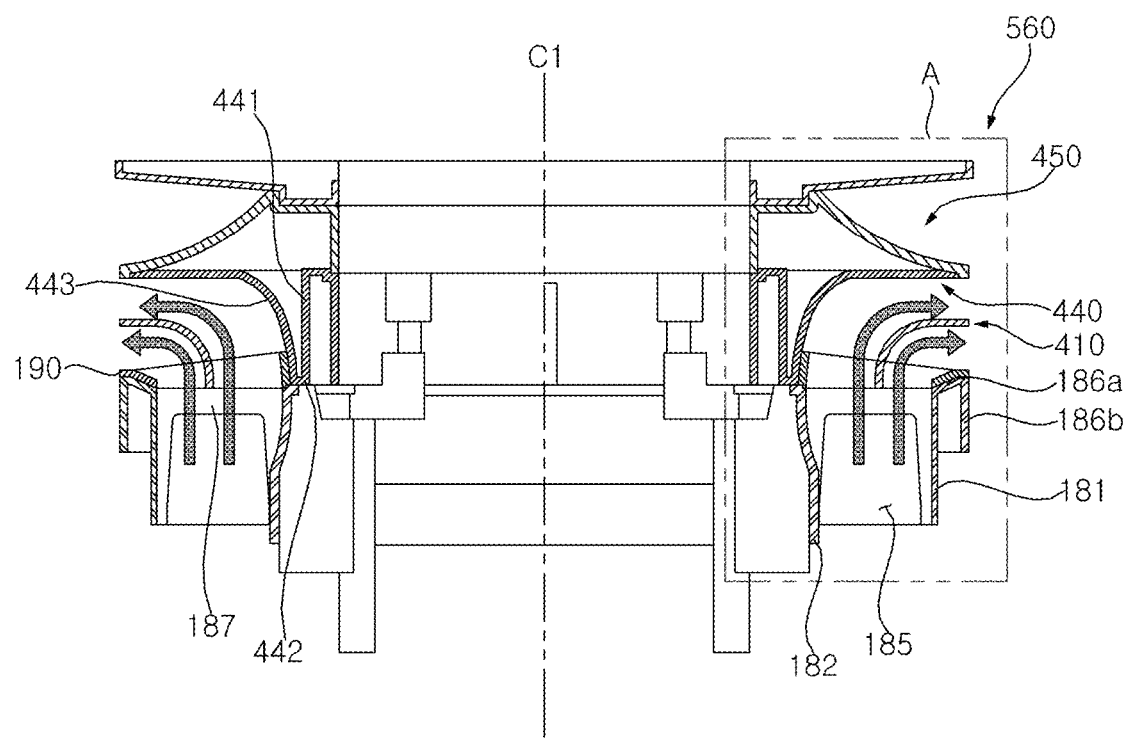
FIGS. 9A and 9B are views showing a first embodiment of the present disclosure for comparison with other embodiments shown in FIGS. 7A and 7B and 8A and 8B.
Figure 9B:
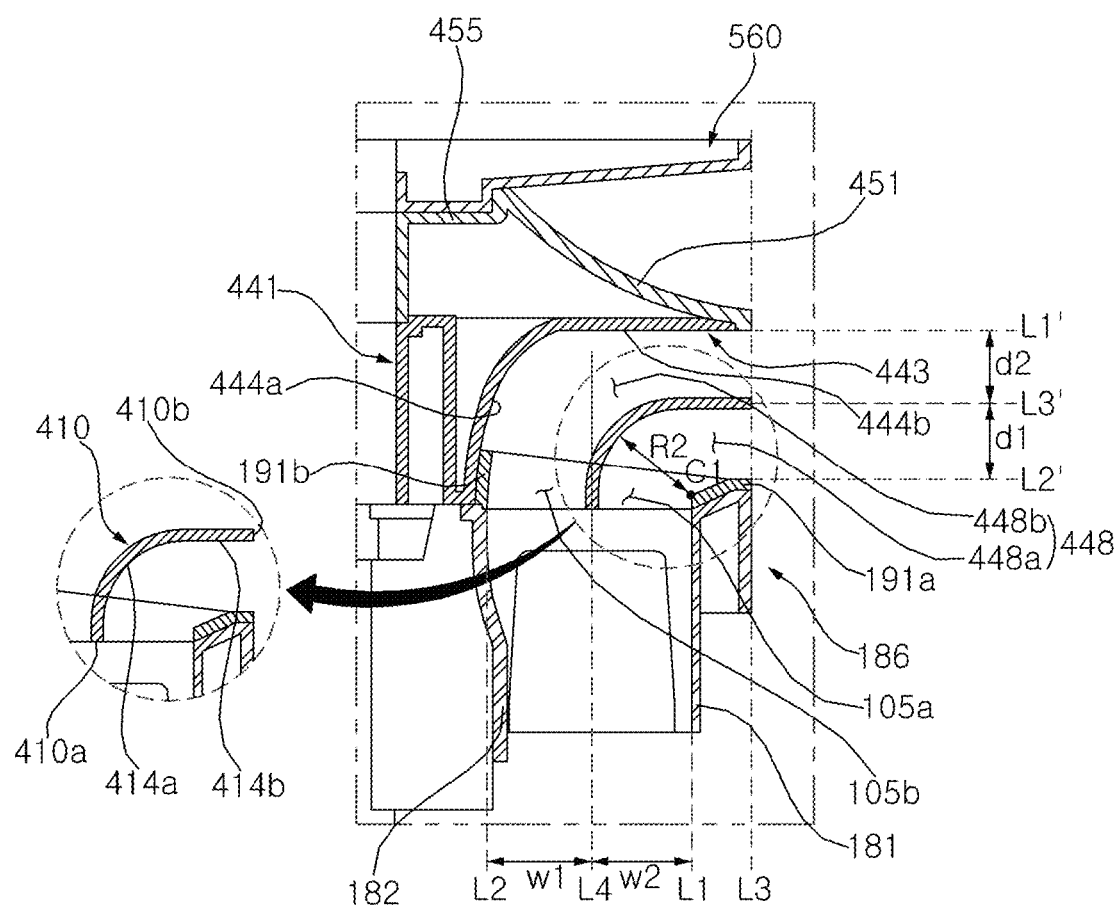

Meanwhile, a space between the outer circumferential surface of the splitter 410 and the body outer wall 191a may be defined as the first channel 448a, and a space between the inner circumferential surface of the splitter 410 and the partition plate 430 may be defined as the second channel 448b (see FIG. 9B).

Air discharged from the first outlet 105 to the first channel 448a may collide with a curved portion 414a of the splitter 410 and thus be diverted to the radially outward direction. Thereafter, the splitter 410 may be guided in the radially outward direction while flowing along a flat portion 414b of the splitter 410.

And, the air discharged from the first outlet 105 to the second channel 448b may collide with a curved portion 444a provided in the first plate 440 of the partition plate 430 and thus change the flow direction thereof to the radially outward direction. Thereafter, the air may be guided in the radially outward direction by the flat portion 414*b* provided in the first plate 440 of the splitter 410 and the flat portion 414*b* provided in the splitter 410.

Meanwhile, when the second fan 260 is driven, indoor air may be intaken into the second case 201 through the second inlet 202.

The intake air passes through the second filter member 220, and in this process, foreign substances in the air may be filtered out. In addition, while the air passes through the second filter member 220, the air may be intaken and filtered in the radial direction of the first filter member 120 and then may flow upward.

The air having passed through the second filter member 220 flows upward with respect to the radial direction while passing through the second fan 160, and the stable upward flow of the air is achieved while the air passes through the third air guide device 270 and the second discharge guide device 280. The air having passed through the third air guide device 270 and the second discharge guide device 280 may be discharged through the second outlet 305 via the flow diverting device 300.

In this case, when the flow diverting device 300 is in a lying position, the air discharged from the flow diverting device 300 may flow upward. On the other hand, when the flow diverting device 300 is in a standing position, the air discharged from the flow diverting device 300 may flow toward a front upper side. By the flow diverting device 300, the amount of air discharged from the air cleaner 10 increases, and there is an advantage in that purified air can be supplied to a location far away from the air cleaner 10.

Figure 7A:
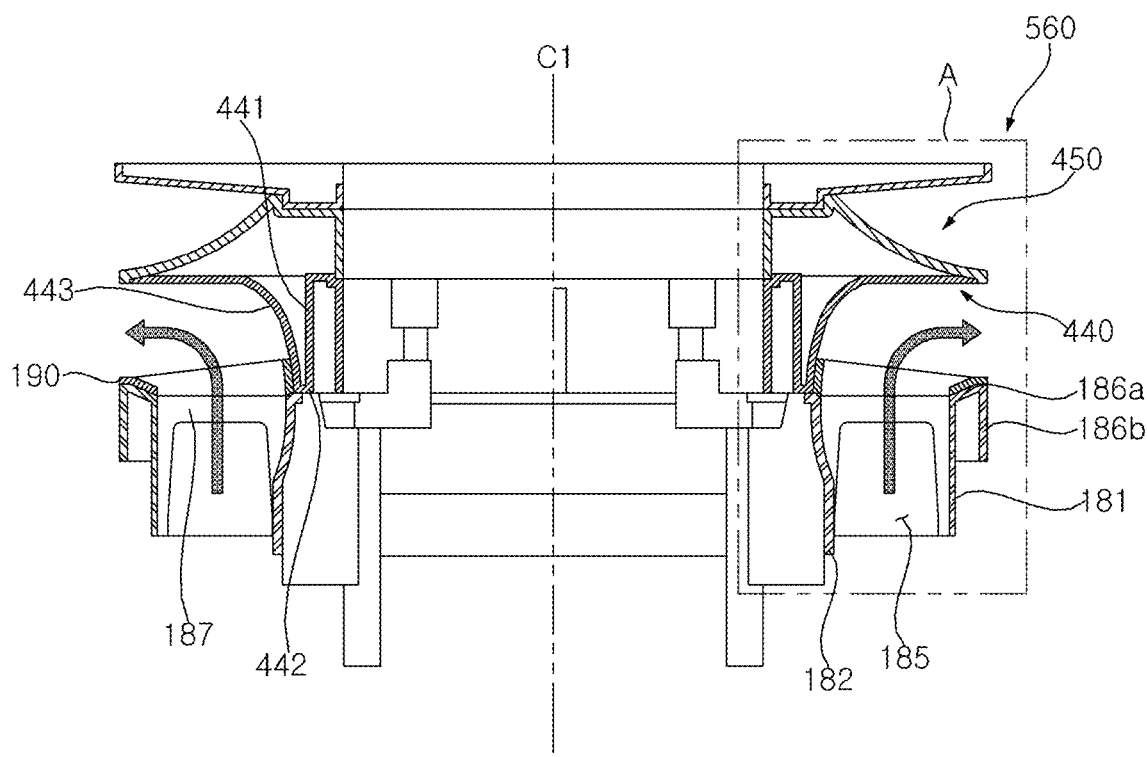
FIGS. 7A and 7B are views showing another embodiment for comparison with an embodiment of the present disclosure.
Figure 7B:
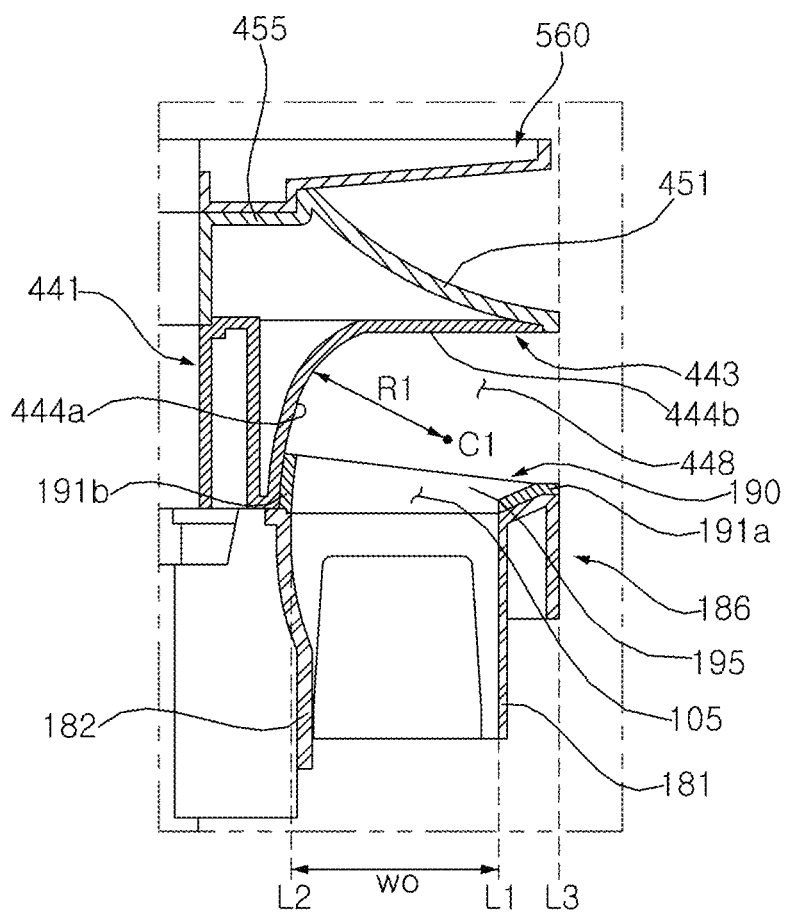

FIGS. 7A and 7B are views showing another embodiment for comparison with an embodiment of the present disclosure. FIG. 7A is a cross-sectional view taken along line X-X' in FIG. 3 of the embodiment in which the splitter 410 does not exist, and FIG. 7B is a view showing a part "A" of FIG. 7A.

Referring to FIGS. 7A and 7B, a first blowing device 100 according to an embodiment of the present disclosure may include a second air guide device 180 and a first discharge guide device 190 coupled to an upper side of the second air guide device 180 and having the first outlet 105.

The air cleaner 10 may include a partition plate 430, which is disposed above the first discharge guide device 190 and guides the air discharged through a first outlet 105 in a radially outward direction of the air cleaner 10. The partition plate 430 may include a first plate 440, which is formed to be rounded upward from the inner circumference of the first outlet 105 and extends in a radial direction of the first outlet 105.

The air cleaner 10 may further include a lever supporting device 560 coupled to an upper side of the partition plate 430. The lever supporting device 560 may form a lower configuration of the second blowing device 200.

Air having passed through the first fan 160 may flow upward while passing through the first air guide device 170 and then discharged upward from the first discharge guide device 190 through the second air guide device 180. The upwardly discharged air may be diverted in the radially outward direction by the partition plate 430 to be discharged to the outside of the air cleaner 10.

A plate outer wall 443 of the first plate 440 may be supported by the upper side of a second guide wall 182 of the second air guide device 180. The plate outer wall 443 may include a curved portion 444*a*, which extends in a rounded manner at a set curvature from the first outlet 105. A direction in which the curved portion 444*a* extends in a rounded manner may be understood as a direction in which the plate outer wall 443 extends upward with respect to the radially outward direction.

Due to the configuration of the curved portion 444*a* as described above, it is possible to divert the direction of air to the radially outward direction while reducing the flow resistance to air discharged upward through the first outlet 105 of the first discharge guide device 190.

The plate outer wall 443 may include a flat portion 444*b* that extends linearly. The flat portion 444*b* may extend in the radially outward direction from the curved portion 444*a*. As the flat portion 444*b* is provided, the air having started to be diverted through the curved portion 444*a* may be guided by the flat portion 444*b* and discharged in the radially outward direction of the air cleaner 10.

The second plate 450 may be coupled to an upper side of the first plate 440. The second plate body 451 of the second plate 450 may include an inclined surface that extends in a rounded manner.

The second air guide device 180 may include a bent portion 186 that extends in an outward direction from the first guide wall 181. The bent portion 186 may include a first extension portion 186*a* extending in the radially outward direction from the first guide wall 181 and a second extension portion 186*b* extending downward from the first extension portion 186*a*.

The first extension portion 186*a* of the bent portion 186 may support the body outer wall 191*a* of the first discharge guide device 190. In addition, due to the supporting structure of the first extension portion 186*a* and the body outer wall 191*a*, an air discharging flow path may be reduced by a radial width of the body outer wall 191*a*, and accordingly, the upper side of the air discharging flow path may be covered by the partition plate 430. A space between the first plate 440 and the first discharge guide device 190 may form a space portion 448 for guiding discharge of air.

The first discharge guide device 190 may be disposed above the second air guide device 180. The first discharge guide device 190 may include a first discharge body 191 having an annular shape. The first discharge body 191 may include a plurality of discharge grilles 195 forming the first outlet 105. The body inner wall 191*b* of the first discharge body 191 may be disposed to contact an outer surface of the curved portion 444*a*.

The first discharge body 191 may further include a bending support (not shown) provided along the edge of the first discharge body 191. The bending support (not shown) may be provided between the plurality of discharge grilles 195. In addition, the bending support (not shown) may be disposed between two adjacent discharge grilles (not shown) among the plurality of discharge grilles 195. Such a bending support (not shown) may be provided in plurality.

The bending support (not shown) may be the body outer wall 191*a* (see FIG. 4) of the first discharge body 191 extending with an inclination inward of the radial direction. The bending support may be referred to as the body outer wall 191*a*.

In the space in which the first extension portion 186*a* and the body outer wall 191*a* are aligned in the up-down direction, the discharge of air may be blocked. In summary, the first outlet 105 is to be understood as an inner space formed by the body inner wall 191*b* of the first discharge body 191, the two most adjacent discharge grilles 195, and the body outer wall 191*a*. Such a first outlet 105 may be provided in plurality.

The outer circumferential end of the partition plate 430 may be located more outside than an outer circumferential end of the first outlet 105. That is, in defining a first virtual line L1 extending in the up-down direction from the outer circumferential end of the first outlet 105, the first virtual line L1 may pass through the partition plate 430.

In defining a second virtual line L2 extending in the up-down direction from the upper side of the outer circumferential surface of the second guide wall 182 of the second air guide device 180, the second virtual line L2 may pass through the innermost portion of the first outlet 105.

The first virtual line L1 may pass through the inner circumferential surface of the body outer wall 191a of the first discharge body 191. In addition, the second virtual line L2 may pass through the body inner wall 191b of the first discharge body 191. Accordingly, a distance w0 between the first virtual line L1 and the second virtual line L2 may represent a width of the first outlet 105.

Meanwhile, in defining a third virtual line L3 extending the outer circumferential surface of the second extension 186b in the up-down direction, the third virtual line L3 may pass through an end portion of the partition plate 430.

A distance w0' between the second virtual line L2 and the third virtual line L3 may represent a radial width of the first extension portion 186a or the body outer wall 191a. In addition, the radial width of the partition plate 430 may correspond to the sum of the width w0 of the first outlet 105 and the width w0 of the first extension portion 186a.

In summary, it is understood that the body inner wall 191b of the first discharge body 191 is disposed to contact the curved portion 444a of the partition plate 430, and that the innermost portion of the first outlet 105 is disposed at a position corresponding to the curved portion 444a. In addition, a radial width w0'w0' of the partition plate 430 may be formed to be greater than the width w0 of the first outlet 105 by the width w0' of the first extension portion 186a.

Figure 8A:
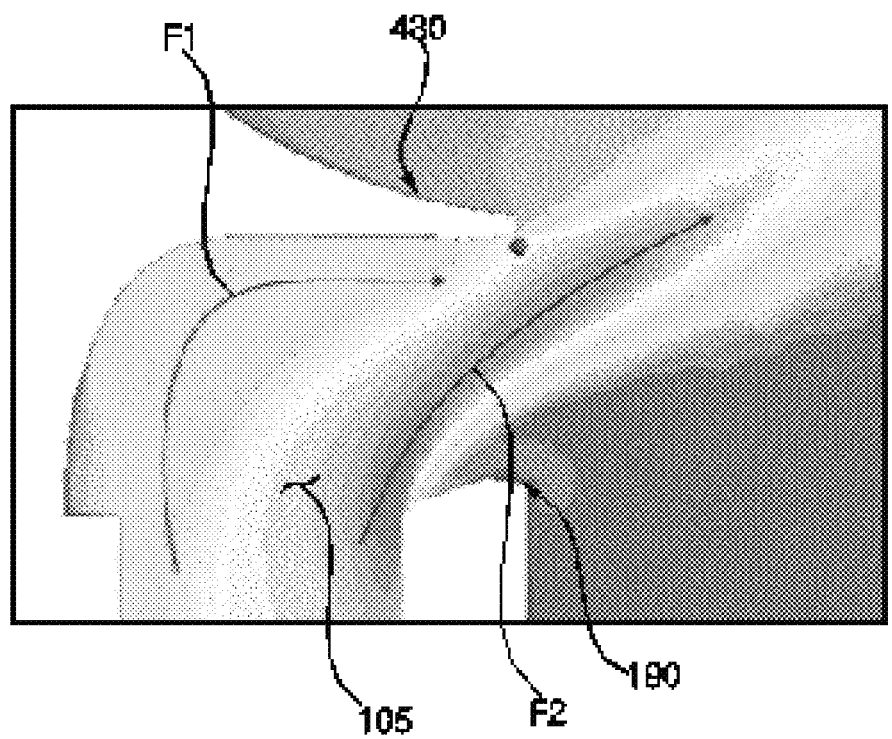
FIGS. 8A and 8B are simulations of air flow in the embodiment according to FIG. 7B through computational fluid dynamics (CFD).
Figure 8B:
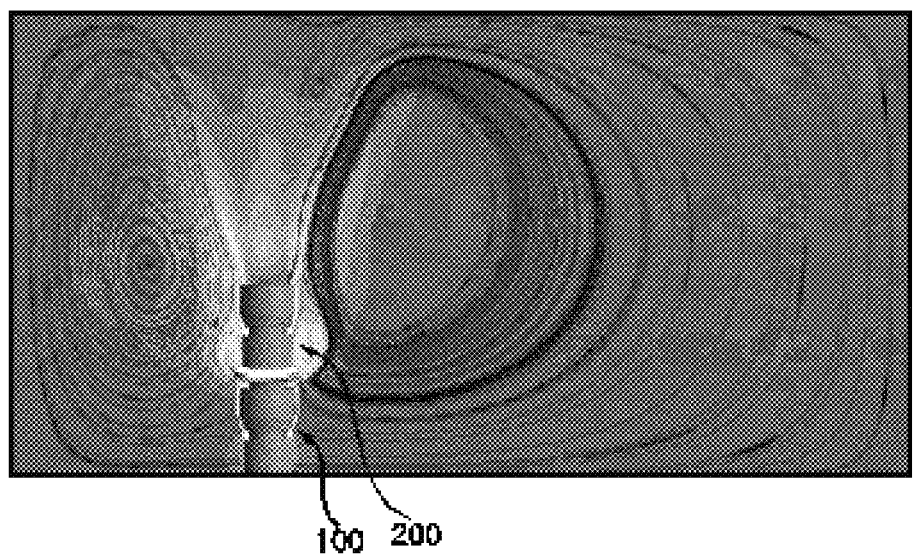

FIGS. 8A and 8B are simulations of air flow in the embodiment according to FIG. 7B through computational fluid dynamics (CFD). FIG. 8A is an enlarged view of the outlet of FIG. 7B, and FIG. 8B is an overall view of a model to which FIG. 7B is applied.

As described above, the first fan 160 may be a centrifugal fan that discharges air outward and upward with respect to the radial direction (see FIG. 5). As the first fan 160, which is a centrifugal fan, rotates, air in the first blowing device 200 receives a centrifugal force in a radially outward direction. Accordingly, when the first fan 160 rotates, an air flow rate or an air density increases from the inner side to the outer side of the radial direction.

Referring to FIG. 8A, the first fan 160, which is a centrifugal fan, rotates to discharge air outward and upward with respect to the radial direction. In this case, it is found that the air density and air flow rate of the upward flow are significantly higher on an outer side than on an inner side of the radial direction.

Meanwhile, the flow amount of air colliding with the curved portion 444a of the partition plate 430 and diverted in direction to the side is relatively smaller than the flow amount of air rising outward with respect to the radial direction, and thus, in this case, it is not possible to sufficiently divert the direction of the upward flow discharged from the first outlet 105. Therefore, it is found that the air discharged from the first outlet 105 rises approximately in a diagonal direction, as shown in the simulation result.

Referring to FIG. 8B, an upward flow that flows in the diagonal direction without receiving resistance from the partition plate 430 may cause a whirlwind phenomenon. When such a whirlwind phenomenon occurs, there may be a problem in that the air discharged from the first blower 100 flows into the second blowing device 200. In addition, the whirlwind prevents an inflow of unpurified external air into the second blowing device 200 located at the upper portion, thereby causing a problem that the air flow rate of the second blowing device 200 located at the upper portion is reduced.

FIGS. 9A and 9B are views showing a first embodiment of the present disclosure for comparison with other embodiments shown in FIGS. 7A and 7B and 8A and 8B. FIG. 9A is a cross-sectional view taken along line X-X' in FIG. 3, and FIG. 9B is a view showing the part "A" of FIG. 9A.

Referring to FIGS. 9A and 9B, the first blowing device 100 according to an embodiment of the present disclosure may include a splitter 410. The splitter 410 may be disposed between the first plate 440 of the partition plate 430 and the first discharge guide device 190 forming the first outlet 105.

One end 410a of the splitter 410 may be located between an inner circumference of the first outlet 105 and an outer circumference of the first outlet 105. That is, the one end 410a of the splitter 410 may be located in the first discharge body 191 between the body outer wall 191a, which forms the outer circumferential surface, and the body inner wall 191b, which forms the inner circumferential surface. The one end 410a of the splitter 410 may be understood as a radially inner end of the curved portion 414a of the splitter 410 or a radially innermost portion of the splitter 410.

The one end 410a of the splitter 410 may be located in the middle between the body outer wall 191a and the body inner wall 191b. Between the body outer wall 191a forming the outer circumferential surface of the first discharge body 191 and the body inner wall 191b forming the inner circumferential surface of the first discharge body 191, the one end 410a of the splitter 410 may form a ring shape extending in the circumferential direction.

The one end 410a of the splitter 410 may be inserted into the first discharge guide device 190, may be supported by being coupled to the first discharge guide device 190 in a manner such as attachment, connection, or fastening, or may be formed integrally with the first discharge guide device 190. The one end 410a of the splitter 410 may be inserted and coupled between the plurality of discharge grilles 195. For example, the one end 410a of the splitter 410 may include a plurality of grooves corresponding to the plurality of discharge grilles 195.

In addition, the other end 410b of the splitter 410 may be supported by a plurality of supports (not shown) arranged in the circumferential direction from the outer circumferential surface of the first discharge guide device 190. The plurality of supports (not shown) may extend upward from the second extension portion 186b.

The splitter 410 may be formed to be rounded upward from the first discharge guide device 190 and extend in the radial direction of the first outlet. The splitter 410 may include a curved portion 414a and a flat portion 414b.

The splitter 410 may include the curved portion 414a extending upward from the first discharge guide device 190 and rounded with a set curvature. A direction in which the curved portion 414a extends in a rounded manner may be understood as a direction extending upward with respect to the radially outward direction from a lower end that forms the one end 410a of the splitter 410.

Due to the configuration of the curved portion 414a as described above, it is possible to easily divert the direction of air to the radially outward direction while reducing the flow resistance to air discharged upward through the first outlet 105 of the first discharge guide device 190.

The splitter 410 may include a flat portion 414b that extends linearly. The flat portion 414b may extend horizontally in the radially outward direction from the curved portion 414a. As the flat portion 414b is provided, the air having started to be diverted through the curved portion 414a is guided by the flat portion 414b, so the straightness of the air flow in the air discharge direction of the air cleaner 10 is improved and thus the air may be easily discharged. That is, the splitter 410 may guide the air discharged from the first outlet 105 in the radially outward direction.

The partition plate 430 and the splitter 410 may each have at least a portion of a predetermined curvature. The curved portion 414a of the splitter 410 and the curved portion 444a of the first plate 440 of the partition plate 430 may each have a predetermined curvature. A radius of curvature R2 formed by the splitter 410 may be smaller than a radius of curvature R1 formed by the first plate of the partition plate 430 (see FIG. 7B). That is, a curvature formed by the curved portion 414a of the splitter 410 may be greater than a curvature formed by the curved portion 444a of the first plate 440 of the partition plate 430.

Meanwhile, as described above, the space between the outer circumferential surface of the splitter 410 and the body outer wall 191a may be defined as a first channel 448a, and the space between the inner circumferential surface of the splitter 410 and the first plate 440 of the partition plate 430 may be defined as a second channel 448b. The space portion 448 illustrated in FIG. 7B may be divided into the first channel 448a and the second channel 448b by a splitter 410.

The splitter 410 may separate an air flow discharged from the first outlet 105. The air flow discharged from the first outlet 105 may be separated by the splitter 410 to flow into the first channel 448a and the second channel 448b, respectively.

A flow rate of air between the splitter 410 and the first outlet 105 may be greater than a flow rate of air between the splitter and the partition plate. That is, the air discharged from the first outlet 105 may flow more in the first channel 448a than in the second channel 448b. When the first fan 160, which is a centrifugal fan, rotates, the flow rate or density of air by centrifugal force increases from an inner side to an outer side of the radial direction, and thus, an air flow rate in the first channel 448a located in the radially outward direction with respect to the one end 410a of the splitter 410 may be greater than an air flow rate in the second channel 448b.

Meanwhile, as the one end 410a of the splitter 410 is disposed adjacent to the outer circumference or inner circumference of the first outlet 105, the flow rate of the discharged air rising in the diagonal direction increases, thereby increasing a possibility of occurrence of whirlwind. Therefore, in order to prevent the whirlwind, the one end 410a of the splitter 410 is preferably spaced apart from the body outer wall 191a and the body inner wall 191b by an appropriate distance. For example, the one end 410a of the splitter 410 may be located adjacent to the middle between the body inner wall 191b and the body outer wall 191a.

As described above, it is possible to define a first virtual line L1 extending the outer circumferential end of the first outlet 105 in the up-down direction, and a second virtual line L2 extending the innermost portion of the first outlet 105 in the up-down direction. In this case, the first virtual line L1 may be a radially inner circumferential surface of the body outer wall 191a extending in the up-down direction. In addition, the second virtual line L2 may be a radially outer circumferential surface of the body inner wall 191b extending in the up-down direction.

In addition, a third virtual line L3 extending the outer circumferential surface of the second extension portion 186b in the up-down direction may be defined. The third virtual line L3 may be an extension of the radially outer circumferential surface of the body outer wall 191a in the up-down direction.

Meanwhile, a fourth virtual line L4 extending the one end 410a of the splitter 410 in the up-down direction may be defined. A distance w1 between the fourth virtual line L4 and the first virtual line L1 may represent a width w1 from the one end 410a of the splitter 410 to the body inner wall 191b. A distance w2 between the fourth virtual line L4 and the second virtual line L2 may represent a width w2 from the one end 410a of the splitter 410 to the body outer wall 191a.

The width w1 from the one end 410a of the splitter 410 to the body inner wall 191b may be equal to the width w2 from the one end 410a of the splitter 410 to the body outer wall 191a or may be approximately similar thereto. The distance w1 between the fourth virtual line L4 and the first virtual line L1 may be equal to the distance W2 between the fourth virtual line L4 and the second virtual line L2 or may be approximately similar thereto.

The other end 410b of the splitter 410 may be understood as a radially outermost end of the flat portion 414b of the splitter 410 or an outer circumferential end of the splitter 410. The other end 410b of the splitter 410 may be located more outside than the outer circumference of the first outlet 105. The other end 410b of the splitter 410 may be located outside the first virtual line L1. That is, the other end 410b of the splitter 410 may extend to the outside of the first virtual line L1 in the radial direction. As the flat portion 414b of the splitter 410 extends to the outside of the first outlet 105, the direction of the air flow rising in a diagonal direction may be diverted to the radially outward direction.

Meanwhile, the other end 410b of the splitter 410 may be located at a position corresponding to the third virtual line L3. That is, the other end 410b of the splitter 410 may extend to the third virtual line L3 in the radial direction of the first discharge guide device 190. Alternatively, the other end 410b of the splitter 410 may be positioned between the first virtual line L1 and the third virtual line L3. Since the other end 410b of the splitter 410 does not protrude in a radially outward direction of the third virtual line L3, a sense of unity may be provided in terms of aesthetics.

The other end 410b of the splitter 410 may be positioned between the outer circumferential end of the partition plate 430 and the outer circumference of the first discharge guide device 190. That is, the other end 410b of the splitter 410 may be located at a position corresponding to the third virtual line and be spaced apart from the partition plate 430 and the first discharge guide device 190 by a predetermined distance.

In this case, a vertical distance d1 from the other end 410b of the splitter 410 to the first discharge guide device 190 may be equal to a vertical distance d2 from the other end 410b of the splitter 410 to the partition plate 430 or may be approximately similar thereto.

Figure 10A:
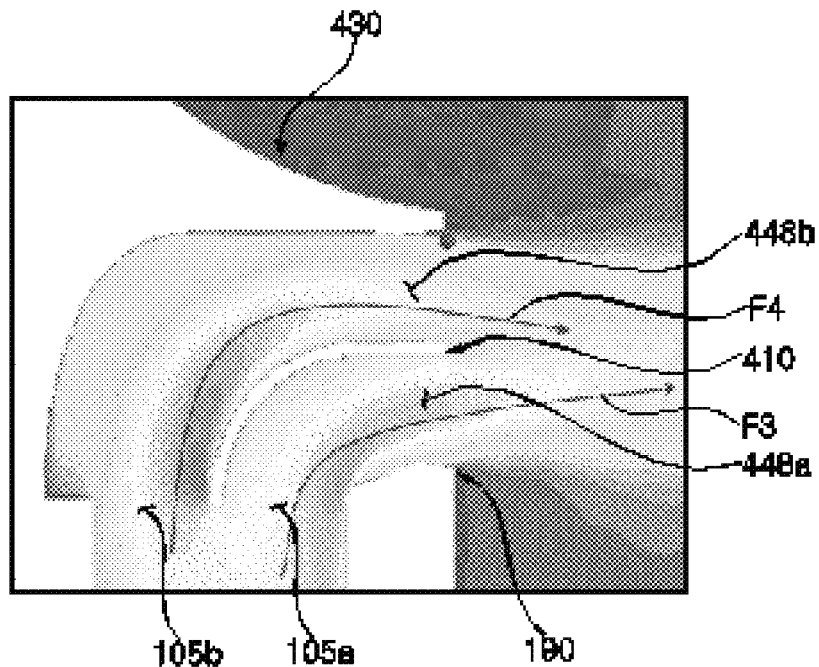
FIGS. 10A and 10B are simulations of air flow of an embodiment according to FIG. 9B through CFD.
Figure 10B:
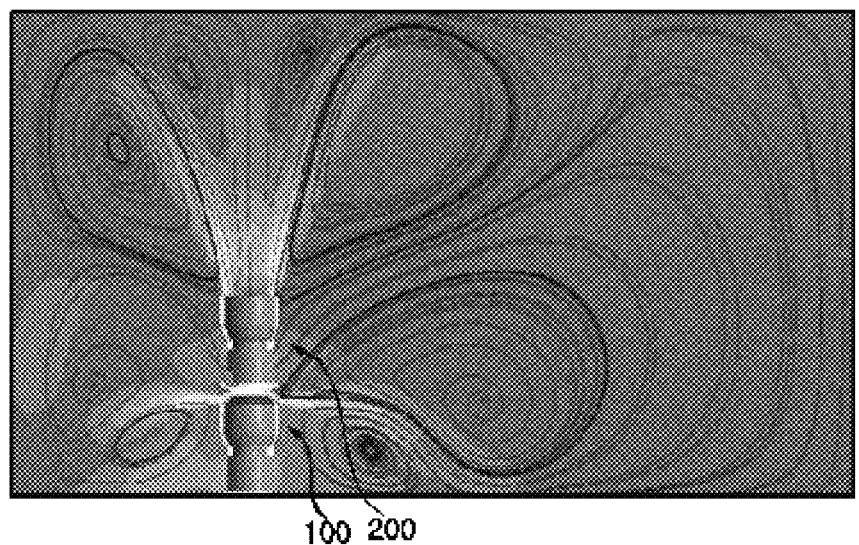

FIGS. 10A and 10B are simulations of air flow of an embodiment according to FIG. 9B through CFD. FIG. 10A is an enlarged view of the outlet side of FIG. 9B, and FIG. 10B is an overall view of a model to which FIG. 9B is applied.

Referring to FIG. 10A, the first fan 160, which is a centrifugal fan, rotates so that air may be discharged radially outward and upward. In this case, as the splitter 410 includes a curved portion 414a formed to be rounded upward and a flat portion 414b extending in a radially outward direction, the flow direction of the airflow rising in a diagonal direction by a centrifugal force may be diverted to the side while resistance improves.

In this case, the air of the upward flow in the first blowing device 100 has a higher density and a higher flow rate on an outer side than in an inner side of the radial direction. Accordingly, a flow rate of the air F3 (hereinafter, referred to as a third flow) passing through the first channel 448a in the upward flow discharged from the first outlet 105 is slightly higher than a flow rate of air F4 (hereinafter, referred to as a fourth flow) passing through the second channel 448b.

In the case of FIG. 8A, air F1 (hereinafter, referred to as a first flow) discharged upward from the first outlet 105 and colliding with the curved portion 444a of the partition plate 430 is diverted, thereby pushing air F2 (hereinafter, referred to as a second flow) rising radially outward. However, since the flow rate of the first flow F1 is relatively lower than the flow rate of the second flow F2, the air flow may not be sufficiently diverted and may be strongly discharged in a diagonal direction.

In comparison, in the case of FIG. 10A, the splitter 410 separates the fourth flow F4 corresponding to the first flow F1 and the third flow F3 corresponding to the second flow F2 and guides the same to the side, and thus, the momentum of the air flow discharged in the horizontal direction may increase.

Referring to FIG. 10B, as the upward flow discharged from the first outlet 105 is separated by the splitter 410, the momentum in the horizontal direction increases, and thus, a whirlwind may be prevented. As a result of the experiment, the first blowing device 100 improves the resistance due to the partition plate 430 and increases the air flow rate by 5%, and the second blowing device 200 reduces the whirlwind, preventing the inflow of air from the outside, and increases the air flow by 3%.

Figure 11:
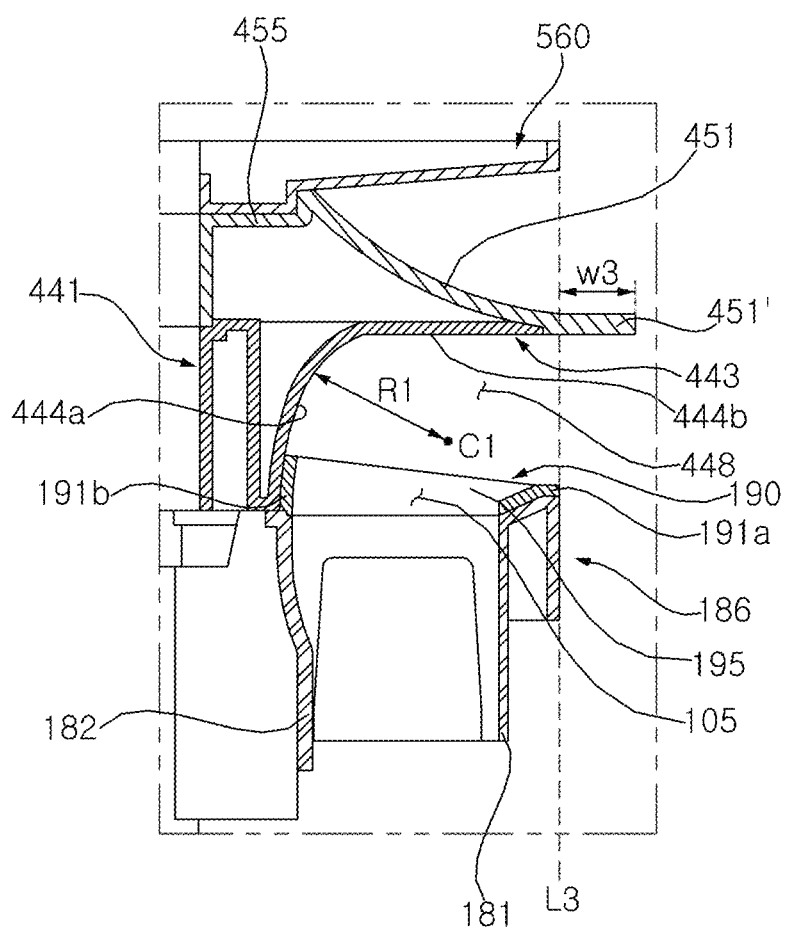
FIG. 11 shows a second embodiment of the part "A" of FIG. 9A.

FIG. 11 shows a second embodiment of a part "A" of FIG. 9A.

Referring to FIG. 11, a partition plate 430 according to the present embodiment may extend in a radial direction to the outside of the outer circumferential surface of the first discharge guide device 190 compared to the partition plate 430 shown in FIG. 7B. The partition plate 430 may extend in the radial direction to the outside of the outer circumferential surface of the body outer wall 191a. For example, the second plate 451 of the partition plate 430 may be coupled to the first plate 440, and the first plate 440 and/or the second plate 451 may extend to the outside of the outer circumferential surface of the first discharge guide device 190.

In addition, the partition plate 430 may extend in a radial direction to the outside of the lower circumferential surface of the second case 201 in which the second inlet 202 is formed. For example, the second plate 451 of the partition plate 430 may be coupled to the first plate 443, and the first plate 440 and/or the second plate 451 may extend to the outside of the lower circumferential surface of the second case 201.

The third virtual line L3 may pass through the lower circumferential surface of the second case 201 forming the second inlet 202 in the lower circumferential surface. Alternatively, the third virtual line L3 may be located outside the lower circumferential surface of the second case 201.

At this point, the outer circumferential end 451' of the partition plate 430 may be located outside the third virtual line L3. In this case, the upward flow discharged from the first outlet 105 and rising in a diagonal direction may collide with the outermost portion 451' of the partition plate. A width w3 of the cross section of the outer circumferential end 451' of the partition plate 430 protruding outward from the first virtual line L1 is preferably within 20 mm. This will be described later.

Figure 12A:
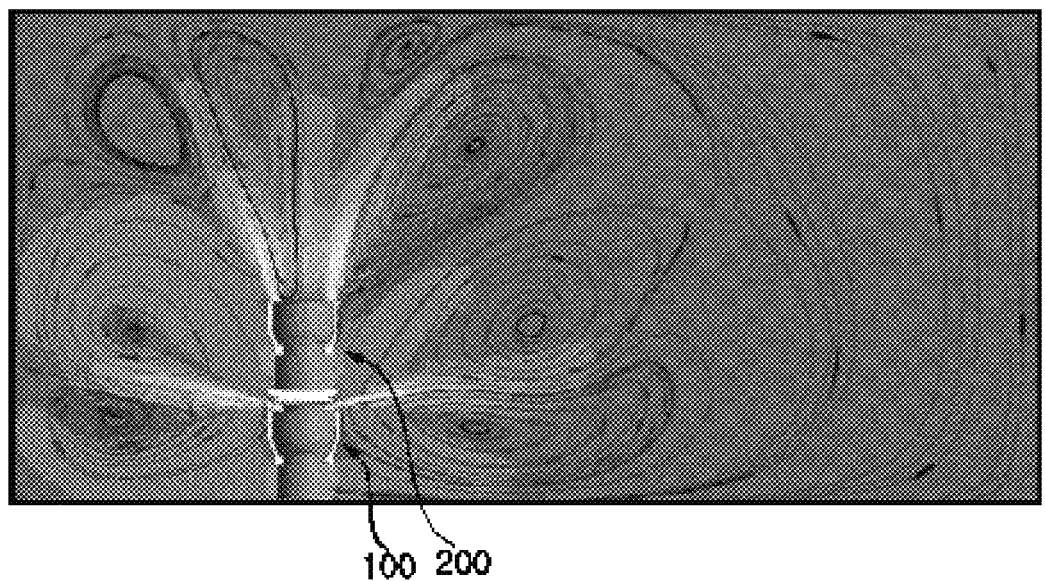
FIGS. 12A to 12C are simulations of air flow of an embodiment according to FIG. 11 through CFD.
Figure 12B:
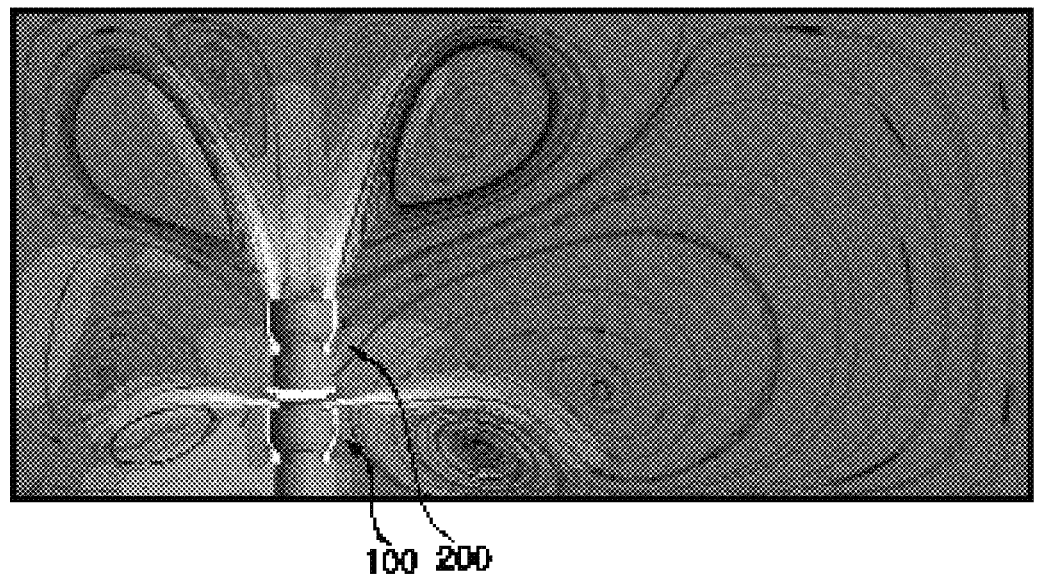
Figure 12C:
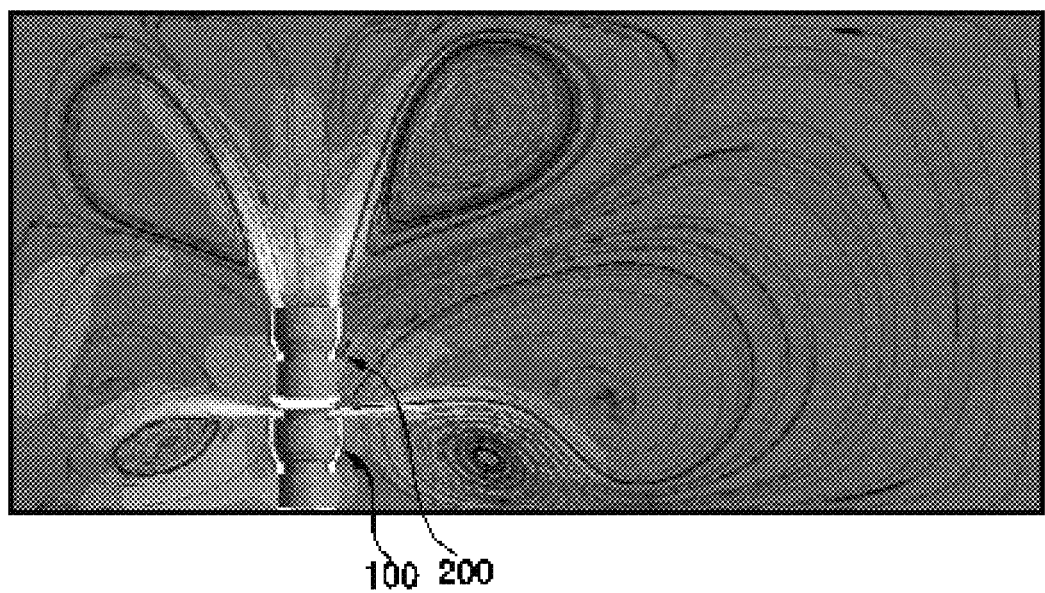

FIGS. 12A to 12C are simulations of air flow of an embodiment according to FIG. 11 through CFD. FIG. 12A is the result of a simulation in a case where the protruding width w5 of the partition plate of FIG. 11 is 10 mm, FIG. 12B is the result of a simulation in a case where the protruding width w5 is 20 mm, and FIG. 12C is the result of a simulation in a case where the protruding width w5 is 40 mm.

Referring to FIG. 12A, an upward flow discharged from the first outlet 105 and rising in a diagonal direction collides with the outer circumferential end 451' of the partition plate 430, and momentum of an air flowing to the side becomes stronger and whirlwind decreases, compared to FIG. 8B in which the protrusion width w5 of the partition plate is close to 0.

Referring to FIG. 12B, when the protruding width w5 of the partition plate 430 is about 20 mm, the reduction of whirlwind becomes the maximum, and, as shown in FIG. 12C, when the protruding width w5 is about 40 mm, a flow pattern similar to that of FIG. 12B, in which the protruding width w5 is about 20 mm, is observed. That is, the whirlwind is almost completely improved from when the protrusion width w5 is about 20 mm or longer, and there is little change in the flow pattern even when the protrusion width w5 is longer than 20 mm. As the length of the partition plate 430 protruding to the outside increases, there may be disadvantages in aesthetics, such as damage to a sense of unity, and thus, considering this, it is preferable to protrude up to about 20 mm.

Figure 13:
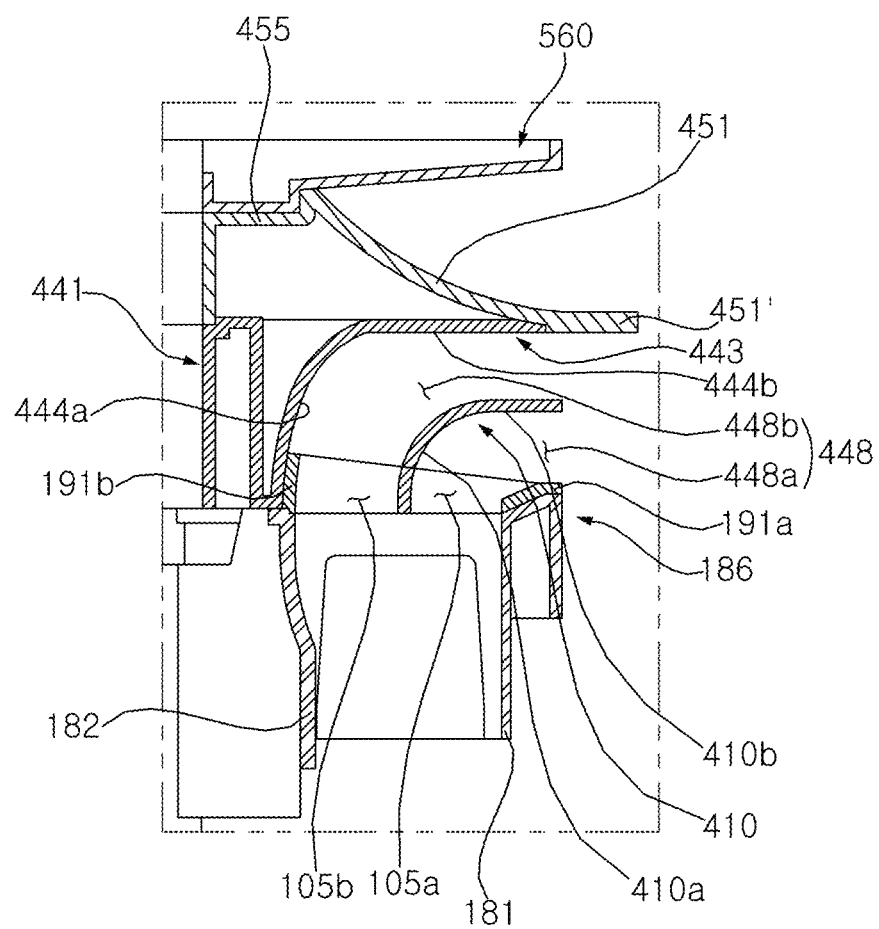
FIG. 13 shows a third embodiment of the part "A" of FIGS. 7A and 7B.

FIG. 13 shows a third embodiment of the part "A" of FIGS. 7A and 7B.

Referring to FIG. 13, as illustrated, an embodiment of the present disclosure may combine the second embodiment shown in FIG. 9B and the third embodiment shown in FIG. 11. Since the description of each embodiment has been described above, it will be hereinafter omitted.

While the present disclosure has been particularly shown and described with reference to preferred embodiments thereof, it will be understood by those skilled in the art that various changes in form and details may be made therein without departing from the spirit and scope of the present disclosure as defined by the appended claims. The preferred embodiments should be considered in descriptive sense only and not for purposes of limitation. Therefore, the scope of the present disclosure is defined not by the detailed description of the present disclosure but by the appended claims, and all differences within the scope will be construed as being included in the present disclosure.

[Detailed Description of Main Elements]

| | |
|---|---|
| 100: first blowing device | 200: second blowing device |
| 300: flow diverting device | 400: partition device |
| 430: partition plate | 410: splitter |
| 410a: one end of the splitter | 410b: the other end of the splitter |
| 414a: curved portion | 414b: flat portion |

What is claimed is:

1. An air cleaner comprising:
a first blowing device having (i) a first inlet defined at a lower part thereof and (ii) a first outlet defined at an upper surface thereof, the first outlet extending in a circumferential direction;

a second blowing device disposed above the first blowing device, the second blowing device having a second inlet defined at a lower part thereof; and a partition plate disposed between the first outlet and the second blowing device and configured to guide air discharged from the first outlet to flow in a radially outward direction, wherein the first blowing device comprises:
- a case that defines the first inlet and that is open at an upper side,
- a discharge guide device that is disposed in the open upper side of the case and that defines the first outlet in the circumferential direction, the discharge guide device comprising a plurality of discharge grilles that define a plurality of the first outlets in the circumferential direction,
- a first fan disposed inside of the case and configured to generate an air flow from the first inlet to the first outlet, and
- a splitter that is disposed between the partition plate and the discharge guide device and that extends upward from the discharge guide device in a radial direction of the discharge guide device, the splitter being configured to separate an air flow discharged from the first outlet and to guide the air flow discharged from the first outlet in the radially outward direction, wherein the splitter has a first end that is inserted between the plurality of the discharge grilles, the splitter comprising a concave-convex portion that is disposed at the first end of the splitter, that is concave at a portion corresponding to the plurality of discharge grilles, and that is convex at a portion corresponding to the first outlet, and wherein the discharge guide device comprises:
- a body inner wall that defines an inner circumferential surface of the discharge guide device,
- a body outer wall that defines an outer circumferential surface of the discharge guide device, the body outer wall defining the first outlet between the body inner wall and the body outer wall, and
- a groove portion that is provided between the body outer wall and the body inner wall and that partitions grooves into which the concave-convex portion is inserted.

2. The air cleaner of claim 1, wherein the first end of the splitter is positioned between the body inner wall and the body outer wall.

3. The air cleaner of claim 2, wherein the first end of the splitter extends in the circumferential direction to form a ring shape.

4. The air cleaner of claim 1, wherein a first virtual line is defined along an outer circumferential end of the first outlet in an up-down direction, and
wherein a second end of the splitter extends to an outside of the first virtual line in the radial direction of the discharge guide device.

5. The air cleaner of claim 4, wherein a third virtual line is defined along the outer circumferential surface of the discharge guide device in the up-down direction, and
wherein the second end of the splitter extends to the third virtual line in the radial direction of the discharge guide device.

6. The air cleaner of claim 4, wherein the second end of the splitter is positioned between an outer circumferential end of the partition plate and an outer circumferential end of the discharge guide device.

7. The air cleaner of claim 1, wherein the splitter comprises a curved portion that is rounded upward.

8. The air cleaner of claim 7, wherein the splitter comprises a flat portion extending horizontally in the radially outward direction from the curved portion of the splitter.

9. The air cleaner of claim 7, wherein the partition plate comprises a curved portion that is rounded upward, and
wherein a curvature of the curved portion of the splitter is greater than a curvature of the curved portion of the partition plate.

10. The air cleaner of claim 1, wherein the partition plate is rounded upward from the inner circumferential surface of the discharge guide device and extends in the radially outward direction of the discharge guide device.

11. The air cleaner of claim 10, wherein a third virtual line is defined along the outer circumferential surface of the discharge guide device in an up-down direction, and
wherein the partition plate extends to an outside of the third virtual line in the radial direction of the discharge guide device.

12. The air cleaner of claim 10, wherein the partition plate extends in the radially outward direction to an outside of a lower circumferential surface of the second blowing device.

13. The air cleaner of claim 11, wherein an outer circumferential end of the partition plate is bent downward.

14. The air cleaner of claim 12, wherein an outer circumferential end of the partition plate is bent downward.

15. The air cleaner of claim 1, wherein a flow rate of air between the splitter and the outer circumferential surface of the discharge guide device is greater than a flow rate of air between the splitter and the partition plate.

16. The air cleaner of claim 1, wherein the first fan is a centrifugal fan that allows air to flow obliquely in the radially outward direction toward an upward direction.

17. An air cleaner comprising:
a first blowing device having a first inlet defined in a lower circumferential surface thereof and a first outlet defined in an upper surface thereof in a circumferential direction;
a second blowing device disposed above the first blowing device, the second blowing device having a second inlet defined in a lower circumferential surface thereof; and
a partition plate disposed between the first outlet and the second blowing device and configured to guide air discharged from the first outlet to flow in a radially outward direction,
wherein the first blowing device comprises:
- a case that defines the first inlet and that is open in an upper side,
- a discharge guide device that is disposed in the open upper side of the case and that defines the first outlet in the circumferential direction,
- a first fan disposed inside of the case and configured to generate an air flow from the first inlet to the first outlet, and
- a splitter that is disposed between the partition plate and the discharge guide device and that extends upward from the discharge guide device in a radial direction of the discharge guide device, the splitter being configured to separate an air flow discharged from the first outlet and to guide the air flow discharged from the first outlet in the radially outward direction, and
wherein an outer circumferential end of the partition plate is bent downward.

18. The air cleaner of claim 17, wherein the partition plate is rounded upward from an inner circumferential surface of the discharge guide device and extends in the radially outward direction of the discharge guide device.

19. The air cleaner of claim 18, wherein a virtual line is defined along an outer circumferential surface of the discharge guide device in an up-down direction, and wherein the partition plate extends to an outside of the virtual line in the radial direction of the discharge guide device.

20. The air cleaner of claim 18, wherein the partition plate extends in the radially outward direction to an outside of the lower circumferential surface of the second blowing device.

\* \* \* \* \*